US012659536B2

(12) United States Patent
Han et al.

(10) Patent No.: US 12,659,536 B2
(45) Date of Patent: Jun. 16, 2026

(54) SYSTEM FOR SHARING CONTENT, AND ELECTRONIC DEVICE

(71) Applicant: Samsung Electronics Co., Ltd., Suwon-si (KR)

(72) Inventors: Sangjin Han, Suwon-si (KR); Jongchae Moon, Suwon-si (KR); Yoomi Lee, Suwon-si (KR); Kyungho Jeong, Suwon-si (KR); Hyungrae Cho, Suwon-si (KR); Sangwoong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 18/767,250

(22) Filed: Jul. 9, 2024

(65) Prior Publication Data

US 2024/0364954 A1 Oct. 31, 2024

Related U.S. Application Data

(63) Continuation of application No. PCT/KR2022/017122, filed on Nov. 3, 2022.

(30) Foreign Application Priority Data

Jan. 14, 2022 (KR) ........................ 10-2022-0005604
Feb. 8, 2022 (KR) ........................ 10-2022-0015980

(51) Int. Cl.
*H04N 21/2668* (2011.01)
*H04N 21/218* (2011.01)
(52) U.S. Cl.
CPC ..... *H04N 21/2668* (2013.01); *H04N 21/2181* (2013.01)

(58) Field of Classification Search
CPC ....................... H04N 21/2668; H04N 21/2181
See application file for complete search history.

(56) References Cited

U.S. PATENT DOCUMENTS

| | | |
|---|---|---|
| 6,587,873 B1 | 7/2003 | Nobakht et al. |
| 8,966,546 B2 | 2/2015 | Seo et al. |
| (Continued) | | |

FOREIGN PATENT DOCUMENTS

| | | |
|---|---|---|
| CN | 203104515 U | 7/2013 |
| JP | 2006324809 A | 11/2006 |
| (Continued) | | |

OTHER PUBLICATIONS

International Search Report for PCT/KR2022/017122 mailed Feb. 10, 2023, 5 pages.

(Continued)

*Primary Examiner* — Nnenna N Ekpo
(74) *Attorney, Agent, or Firm* — Nixon & Vanderhye, P.C.

(57) ABSTRACT

A content sharing system may include an electronic device and a display device for sharing content of the electronic device. The electronic device may be configured to transmit first information, including a request to receive content or a request to generate a new channel for content output, to the display device via a server, which provides a service for managing at least one external device registered for each piece of subscriber information, when it is confirmed that a user of the display device is subscribed to the service and the display device is registered to the server. The display device is configured to perform at least one of storing the content or generating the new channel for content output upon receiving the first information via the server.

15 Claims, 20 Drawing Sheets

(56) References Cited

U.S. PATENT DOCUMENTS

| | | | |
|---|---|---|---|
| 2005/0166244 A1 | 7/2005 | Moon | |
| 2010/0175089 A1 | 7/2010 | Seo et al. | |
| 2012/0272148 A1* | 10/2012 | Strober | H04N 21/6543 |
| | | | 715/716 |
| 2013/0036440 A1* | 2/2013 | Eyer | H04L 12/1895 |
| | | | 725/40 |
| 2015/0177943 A1 | 6/2015 | Park et al. | |
| 2016/0227273 A1 | 8/2016 | Lee | |
| 2018/0084297 A1 | 3/2018 | Svendsen et al. | |
| 2019/0069042 A1* | 2/2019 | Choi | H04N 21/4622 |

FOREIGN PATENT DOCUMENTS

| | | | |
|---|---|---|---|
| JP | 2018050269 A | 3/2018 |
| JP | 2021149881 A | 9/2021 |
| KR | 20090013313 A | 2/2009 |
| KR | 20110009447 A | 1/2011 |
| KR | 20120018932 A | 3/2012 |
| KR | 20150074547 A | 7/2015 |
| KR | 20150082075 A | 7/2015 |
| KR | 101564415 B1 | 10/2015 |
| KR | 101646509 B1 | 8/2016 |
| KR | 20170035309 A | 3/2017 |
| KR | 20170079071 A | 7/2017 |
| KR | 20190023315 A | 3/2019 |
| KR | 102141153 B1 | 8/2020 |
| KR | 102145014 B1 | 8/2020 |
| KR | 102235687 B1 | 4/2021 |
| KR | 102391327 B1 | 4/2022 |

OTHER PUBLICATIONS

Written Opinion of the ISA for PCT/KR2022/017122 mailed Feb. 10, 2023, 4 pages.
Examination Report issued Mar. 17, 2026 in Korean Patent Application No. 10-2022-0015980 with English translation.

* cited by examiner

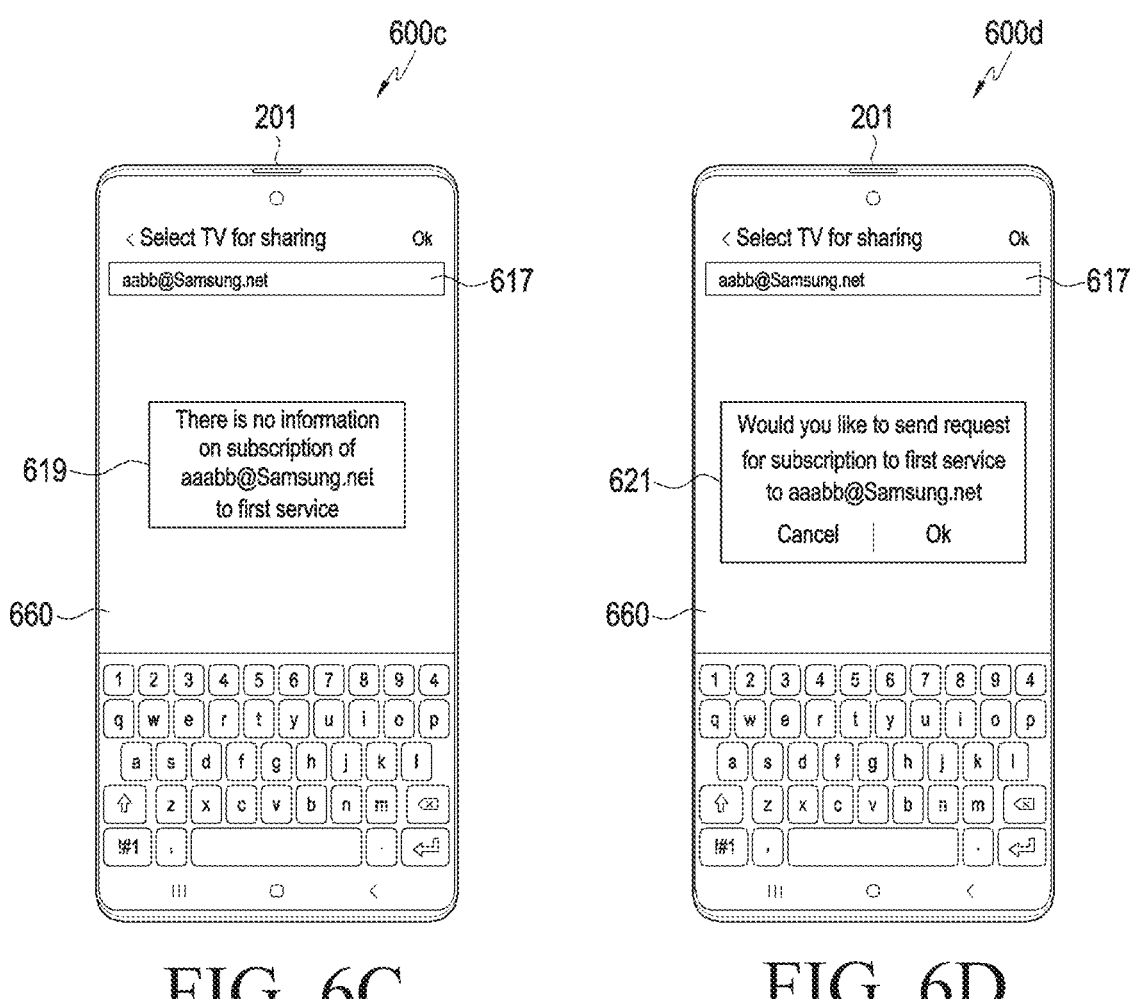
FIG. 6C                    FIG. 6D

SYSTEM FOR SHARING CONTENT, AND ELECTRONIC DEVICE

CROSS-REFERENCE TO RELATED APPLICATIONS

This application is a continuation application of International Application No. PCT/KR2022/017122, designating the United States, filed on Nov. 3, 2022, in the Korean Intellectual Property Receiving Office and claiming priority to Korean Patent Application No. 10-2022-0005604, filed on Jan. 14, 2022, and Korean Patent Application No. 10-2022-0015980, filed on Feb. 8, 2022, in the Korean Intellectual Property Office, the disclosures of which are incorporated by reference herein in their entireties.

BACKGROUND

Field

The disclosure relates to a system and an electronic device for sharing content.

Description of Related Art

A user of an electronic device may output and identify content (for example, photos or videos) shared by another electronic device through an electronic device or television (TV). In order to output the content shared by the other electronic device to the TV, the electronic device may output the content through the searched TV using a mirroring function while the shared content (for example, photos or videos) is displayed on a screen of the electronic device. Alternatively, after downloading the content from the other electronic device, the electronic device may execute a service application capable of outputting the content to the TV and output the content through the TV by uploading the content downloaded to the electronic device to the TV through the service application. Alternatively, after downloading the content from the other electronic device and storing the downloaded content in a storage device such as a USB drive, the electronic device may make connections with the storage device and TV to output the content through the TV.

SUMMARY

When a screen of an electronic device displaying content (for example, photos or videos) is mirrored on a TV in order to output the photos or videos shared by another electronic device to the TV, a search for the surrounding TV should be performed every time to execute a mirroring function, which makes a user feel cumbersomeness, and the electronic device cannot be used while the mirroring function is executed. Further, when the service application is executed in the TV and content is output, a separate subscription to the service application may be needed, account synchronization of the service application may be needed, and storage capacity may be limited for each service application. Alternatively, when content is output through TV using a storage device such as a USB, the connection with the storage device must be made every time when needed.

According to various embodiments, a system and an electronic device for sharing content, capable of outputting content shared by another electronic device to a display device through a channel control, may be provided.

The technical problems solved by the disclosure are not limited to technical problems mentioned herein, and other technical problems and solutions will be clearly understood through the following description.

A system for sharing content according to various embodiments may include an electronic device configured to, based on identifying that a user of a display device to share content of the electronic device subscribes to a service for managing at least one external device registered for each piece of subscriber information and that the display device is registered in a server providing the service, transmit first information including a request for receiving the content or a request for generating a new channel for outputting the content to the display device through the server. The display device may be configured to, based on the first information being received through the server, perform at least one of storage of the content or generation of the new channel for outputting the content.

An electronic device according to various embodiments may include memory, a display, and at least one processor, wherein the processor is configured to, based on first information including a request for receiving content from a first electronic device or a request for generating a new channel for outputting the content being received through a server, perform at least one of storage of the content or generation of the new channel for outputting the content.

According to various embodiments, systems and methods of the present disclosure may output content shared by another electronic device to a display device just through the channel control, thereby obtaining an effect of maintaining a viewing experience of the display device and comfortably enjoying the content.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 6A, 6B, 6C, and 6D are diagrams illustrating example operations in which an example electronic device selects a target to be shared using a second service according to various embodiments;

DETAILED DESCRIPTION

Figure 1:
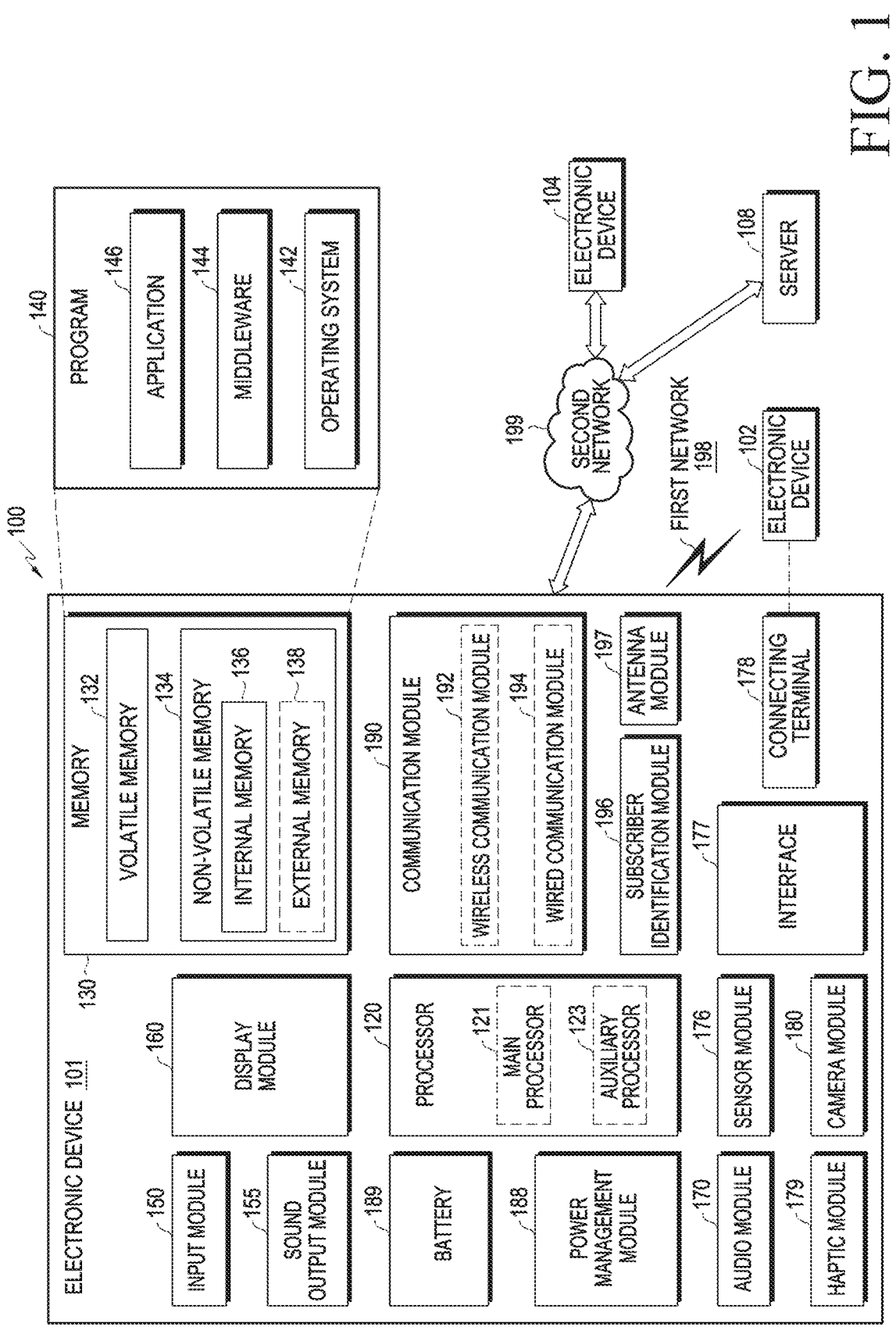
FIG. 1 is a block diagram of an example electronic device within a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added to the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
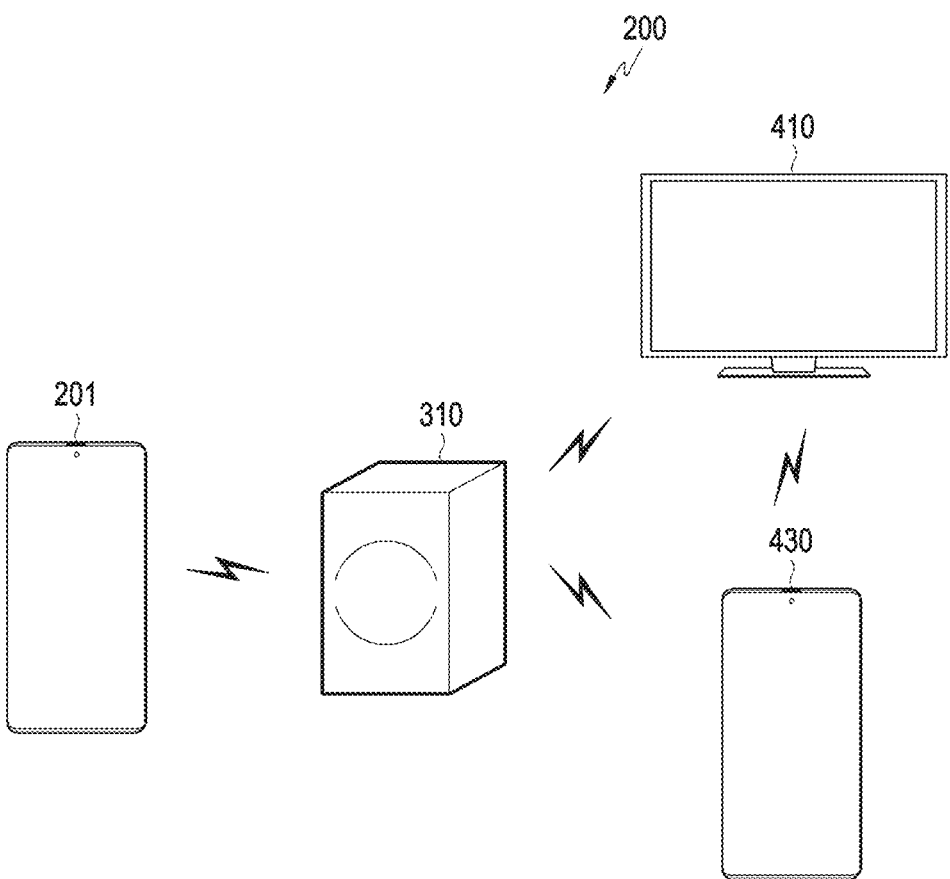
FIG. 2 illustrates an example content-sharing system according to various embodiments.

FIG. 2 is a diagram 200 illustrating an example content-sharing system according to various embodiments.

Referring to FIG. 2, the content-sharing system may include a first electronic device 201, a first server 310, a display device 410, and a second electronic device 430.

According to various embodiments, a first user for sharing content stored in the first electronic device 201 may have subscribed to a first service that manages at least one external electronic device registered for each piece of subscriber information. When identifying that the display device 410 of the first user may be registered in the first server 310 that provides the first service, the first electronic device 201 may transmit first information including a content reception request and a request for generating a new channel for content output to the first server 310. The first electronic device 201 may insert account information of the first user and/or content in the first information.

According to an embodiment, when a display device is selected from a sharing list displayed based on selection of a sharing menu to share content of the first electronic device and at least one contact subscribing to the first service exists in at least one contact included in an address book of the first electronic device 201, the first electronic device 201 may provide a list including the at least one contact subscribing to the first service. When selection of the contact of the first user from the list including the contacts subscribing to the first service is identified, the first electronic device 201 may transmit first information including the content reception request and the request for generating the new channel for content output to the first server 310. The first electronic device 201 may insert account information (for example, an email address) of the first user included as the contact of the first user in the first information.

According to an embodiment, when the first user to share content does not exist in the list including at least one contact subscribing to the first service, the first electronic device 201 may transmit account information of the first user input by the user to search for the first user to the first server 310 and identify that the first user has subscribed to the first service and the display device 410 of the first user is registered in the first server 310, based on the subscription information of the first user received from the first user 310. The first electronic device 201 may add the contact of the first user to the address book, based on the subscription information of the first user and transmit the first information including the content reception request and the request for generating the new channel for content output to the first server 310, based on selection of the contact of the first user.

The first electronic device 201 may include account information (for example, email address) of the first user included as the contact of the first user in the first information.

According to an embodiment, when the first user to share content does not exist in the list including at least one contact subscribing to the first service, the first electronic device 201 may transmit account information of the first user input by the user to search for the first user to the first server 310 and identify that the first user subscribing to the first service and the display device 410 of the first user is not registered in the first server 310, based on the subscription information of the first user received from the first server 310. The first electronic device 201 may transmit a message or email that recommends registration of the display device 410 of the first user in the first server 310 to the first user, based on selection of the user.

According to an embodiment, when the first user to share content does not exist in the list including at least one contact subscribing to the first service, the first electronic device 201 may transmit account information of the first user input by the user to search for the first user to the first server 310 and, receiving information informing that the subscription information of the first user does not exist from the first server 310, transmit, to the first user, a message or email that recommends subscription to the first service 101 and registration of the display device 410 of the first user in the first server 310, based on selection of the user.

According to an embodiment, when there is a history of previous sharing with the display device, the first electronic device 201 may display a sharing item that was previously shared with the display device in a sharing list displayed based on selection of a sharing menu.

According to various embodiments, the first server 310 may provide the first service that manages at least one external device registered for each piece of subscription information and, when receiving first information including the content reception request and the request for generating the new channel for content output received from the first electronic device 201, transmit the first information including at least one of the content reception request or the request for generating the new channel for content output to the display device 410 of the first user subscribing to the first service.

According to an embodiment, the subscription information may include account information of the user and personal information of the user.

According to an embodiment, the first server 310 may make a connection with at least one external device registered for each piece of subscription information, may operate and/or configure the at least one external device, and provide the first service that may control the at least one external device according to a life pattern of the user. Further, when state changes of the at least one external device are made, the first server 310 may provide the first service that may inform of the state changes of the at least one external device through displays or speakers of the at least one device.

According to an embodiment, when a request for identifying whether the account information of the first user has subscribed to the first service is made by the first electronic device 201 subscribing to the first service, the first server 310 may transmit the subscription information of the first user to the first electronic device 201 when the account information of the first user exists, and may transmit information informing that the subscription information of the first user does not exist to the first electronic device 201 when the account information of the first user does not exist.

According to an embodiment, when receiving the first information including the content reception request and the request for generating the new channel for content output from the first electronic device 201, the first server 310 may transmit the first information including the content reception request and the request for generating the new channel for content output to the display device 410 of the first user, based on the account information of the first user included in the first information. The first server 310 may include subscription information of the first electronic device in the first information.

According to an embodiment, when receiving the first information including the content reception request and the request for generating the new channel for content output from the first electronic device 201, the first server 310 may store content of the first electronic device included in the first information in a storage unit of the first server 310, based on the subscription information of the first user and transmit the first information including the request for generating the new channel for content output to the display device 410 of the first user. The first server 310 may include the subscription information of the first electronic device and/or information on the content in the first information. When receiving first channel information newly generated for content output by the first electronic device from the display device 410 after transmission of the first information, the first server 310 may store the first channel information and storage location information of the content of the first electronic device stored in the storage unit of the first server 310 to be correlated with each other. The first channel information may include a channel name (for example, a user name of the first electronic device), a new channel number, and content information.

According to an embodiment, when a request for generating notification information informing the generation of the first channel information newly generated for content output by the first electronic device is made by the display device 410 of the first user, the first server 310 may generate notification information including the channel name (for example, the user name of the first electronic device), the new channel number, and the content information, based on the first channel information received from the display device 410 or the first channel information stored in the first server 410.

According to an embodiment, the first server 310 may transmit the notification information to the display device 410 of the first user.

According to an embodiment, when the existence of the second electronic device 430 is identified among at least one external device registered as account information of the first user, based on the account information of the first user, the first server 310 may transmit the notification information to the display device 410 of the first user and the second electronic device 430.

According to an embodiment, when a request for transmitting content of the first electronic device related to the first channel information is made by the display device 410, the first server 310 may detect, in the storage unit of the first server 310, the content in the storage unit of the first server 310, based on storage location information of the content of the first electronic device stored to be correlated with the first channel information and transmit the detected content to the display device 410. For example, the first server 310 may transmit a file of the content stored in the storage unit to the display device 410 or, when there is a request for reproducing the content, may stream and transmit/service the content to the display device 410 in real time based on multimedia.

According to an embodiment, the first server 310 may sequentially store content of the first electronic device in the storage unit of the first server 310 in the order of reception and, when transmitting content of the first electronic device to the display device 410 according to a request from the display device 410, sequentially transmit the content in the order, starting with the last stored content.

According to an embodiment, when receiving the first information including a request for receiving new content from the first electronic device 201 after the first channel information for content output by the first electronic device is generated, the first server 310 may store the new content of the first electronic device in the storage unit of the first server 310 and store the first channel information to be correlated with storage location information of the new content of the first electronic device stored in the storage unit of the first server 310. When transmitting the content of the first electronic device to the display device 410 according to a request from the display device 410, the first server 310 may output at least one previously stored content and then transmit at least one newly stored content according to the storage order.

According to various embodiments, the display device 410 may include memory (not shown), a display (not shown), and at least one processor (not shown), and, when receiving first information including at least one of the content reception request or the request for generating the new channel for content output through the first server 310, the at least one processor may perform at least one of storage of the content or generation of the new channel for content output.

According to an embodiment, when receiving the first information including the content reception request or the request for generating the new channel for content output through the first server 310, the display device 410 (for example, at least one processor of the display device 410) may store content of the first electronic device included in the first information in the memory of the display device 410 or an external storage device connected to the display device and generate a new channel number for outputting the content of the first electronic device. The display device 410 may generate, as channel information for outputting content of the first electronic device, first channel information including a channel name (for example, a user name of the first electronic device) configured based on subscription information of the first electronic device included in the first information, a new channel number, and information on content generated based on the content included in the first information. The display device 410 may store the first channel information to be correlated with storage location information of content of the first electronic device 201 stored in the display device 410 or the external storage device connected to the display device.

According to an embodiment, when receiving the first information including the request for generating the new channel for content output from the first server 310, the display device 410 (for example, the processor of the display device 410) may generate a new channel number for outputting content of the first electronic device and generate, as channel information for outputting content of the first electronic device, first channel information including a channel name (for example, a user name of the first electronic device) configured based on subscription information of the first electronic device included in the first information, a new channel number, and information on content generated based on content information included in the first information. The display device 410 may transmit the first channel information to the first server 310.

According to an embodiment, the display device 410 (for example, at least one processor of the display device 410) may generate at least one new channel number of a content broadcasting channel provided by the Internet through a set-top box or an application of the display device 410 or a general broadcasting channel reproduced through a TV tuner. Further, the new channel number may be generated in preference to a predetermined broadcasting channel according to a preset priority between the content broadcasting channel or a general broadcasting channel. For example, when the display device 410 can provide the content broadcasting channel provided by the Internet, a new channel number of the content broadcasting channel may be generated in preference to the general broadcasting channel. F For example, when a request for content corresponding to the new channel number is made to the first server 310, based on the new channel number generated by the display device 410, the first server 310 may provide a streaming service for the requested content to the display device 410. For example, the display device 410 may receive content from the first server 310, store the content in the memory of the display device 410, and generate/add a new channel number of the stored content to the general broadcasting channel.

According to an embodiment, when electronic program guide (EPG) data can be identified, the display device 410 (for example, at least one processor of the display device 410) may generate one channel list by combining the content broadcasting channel provided by the Internet through the set-top box or the application of the display device 410 and the general broadcasting channel reproduced through the TV tuner and then generate a next channel number of the last channel number as a new channel number.

According to an embodiment, when electronic program guide (EPG) data cannot be identified, the display device 410 (for example, the processor of the display device 410) may generate a next channel number of the last channel number of the general broadcasting channel reproduced through the TV tuner as a new channel number.

According to an embodiment, the display device 410 (for example, the processor of the display device 410) may make a request for generating notification information that informs of the generation of the new channel to the first server 310 after generating the first channel information for outputting the content of the first electronic device and, when receiving the notification information from the first server 310, display the notification information including the channel name (for example, the user name of the first electronic device), the new channel number, and information on the content on the display device 410.

According to an embodiment, when identifying selection for switching to the new channel number included in the notification information and identifying storage of the content of the first electronic device in the display device 410 or the external storage device connected to the display device 410, the display device 410 (for example, the processor of the display device 410) may detect the content of the first electronic device in the display device or the external storage device connected to the display device, based on the storage location information of the content stored to be correlated with the first channel information generated for outputting the content of the first electronic device, and output the detected content to the display device 410.

According to an embodiment, when identifying selection for switching to the new channel number included in the notification information and identifying that the content of the first electronic device is stored in the first server 310, the display device 410 (for example, at least one processor of the display device 410) may make a request for content stored to be correlated to the first channel information generated for outputting the content of the first electronic device to the first server 310 and output the content received from the first server 310 to the display device 410.

According to an embodiment, when receiving information making a request for switching to the new channel number from the second electronic device 430 registered in account information of the first user and identifying storage of the content of the first electronic device in the display device 410 or the external storage device connected to the display device 410 after generating the first channel information for outputting the content of the first electronic device, the display device 410 (for example, the processor of the display device 410) may detect content of the first electronic device in the display device 410 or the external storage device connected to the display device 410, based on the storage location information of the content stored to be correlated with the first channel information and output the detected content to the display device 410.

According to an embodiment, when receiving information making a request for switching to the new channel number from the second electronic device 430 registered in account information of the first user and identifying that the content of the first electronic device is stored in the first server 310 after generating the first channel information for outputting the content of the first electronic device, the display device 410 (for example, at least one processor of the display device 410) may make a request for the content of the first electronic device stored to be correlated with the first channel information to the first server 310 and output the content received from the first server 310 to the display device 410.

According to an embodiment, the display device 410 (for example, the processor of the display device 410) may receive notification information from the first server 310 in the state in which power of the display device 410 is turned off, and display the notification information on the display device 410 after turning on power of the display device 410.

According to an embodiment, when receiving information making the request for switching to the new channel from the second electronic device 430 registered in the account information of the first user in the state in which power of the display device 410 is turned off, the display device 410 (for example, the processor of the display device 410) may turn on power of the display device 410 and then display the content of the first electronic device detected by the display device 410 or the first server 310 on the display device 410.

According to an embodiment, the display device 410 (for example, the processor of the display device 410) may sequentially store the content of the first electronic device in the display 410 or the external storage device connected to the display device 410 in the order of reception and, when the new channel number included in the first channel information is selected by the user, sequentially transmit the content in the order, starting with the last stored content.

According to an embodiment, when receiving the first information including the request for receiving the new content from the first electronic device 201 after generating the first channel information for outputting the content of the first electronic device, the display device 410 (for example, at least one processor of the display device 410) may store the new content of the first electronic device in the display 410 or the external storage device connected to the display device 410 and store the first channel information to be correlated with storage location information of the new content of the first electronic device stored in the display 410 or the external storage device connected to the display device 410. When the new channel number included in the first channel information is selected by the user, the display device 410 may transmit at least one newly stored content after outputting at least one previously stored content according to the order of storage.

According to an embodiment, the display device 410 (for example, at least one processor of the display device 410) may output content related to a channel number of the first electronic device through channel zapping or channel input while a broadcast is output through the general broadcasting channel reproduced through the TV tuner or while content is output through the content broadcasting channel provided by the Internet through the set-top box.

According to various embodiments, when the second electronic device 430 receives notification information from the first server 310 as one of external devices registered in subscription information of the first user, the second electronic device 430 may display the notification information on the display of the second electronic device 430 and, when identifying selection for switching to the new channel number included in the notification information, transmit information making a request for switching to the new channel number to the display device 410 of the first user.

Figure 3:
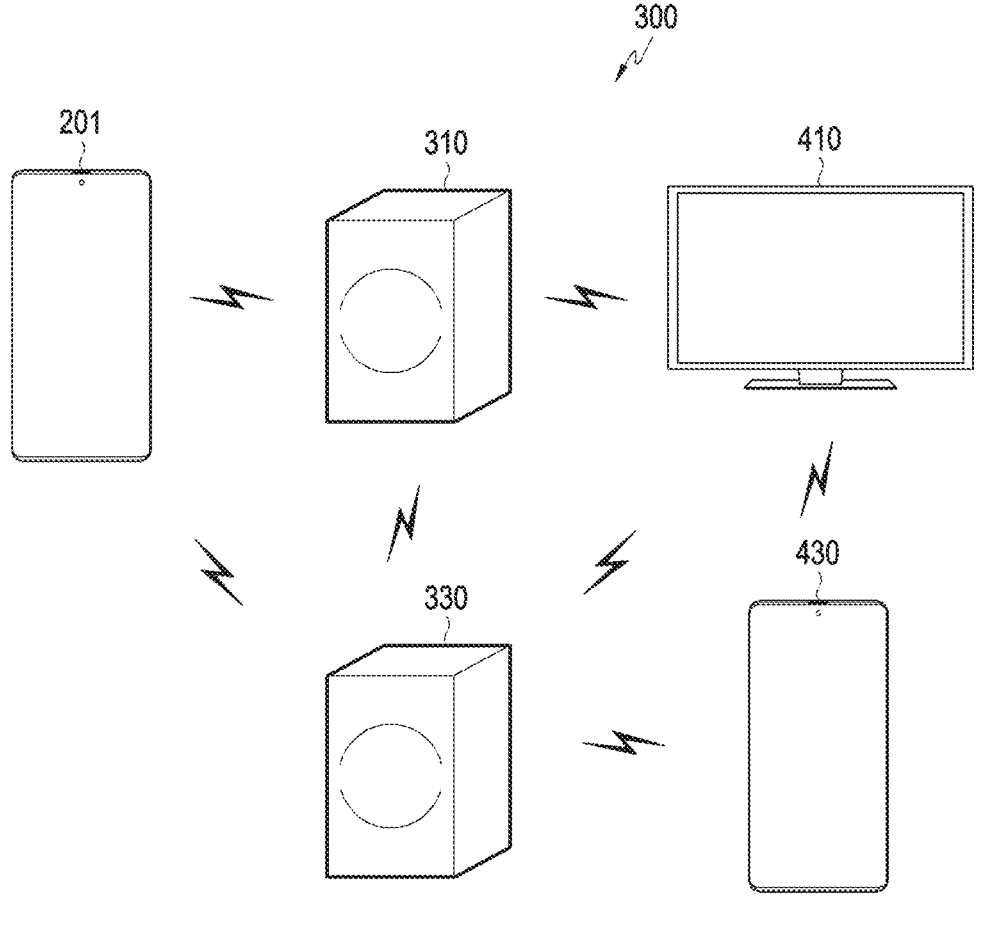
FIG. 3 illustrates an example content-sharing system according to various embodiments.

FIG. 3 is a diagram 300 illustrating an example content-sharing system according to various embodiments.

Referring to FIG. 3, the content-sharing system may include the first electronic device 201, a first server 310, a second server 330, a display device 410, and a second electronic device 430.

According to various embodiments, when the first user to share content stored in the first electronic device 201 has subscribed to a second service that can provide various types of content for respective channel numbers, the first electronic device 201 may transmit first information including a content reception request and a request for generating a new channel for content output to the second server 330. The first electronic device 201 may include account information of the first user and/or content in the first information.

According to an embodiment, when the second service is selected from a sharing list displayed based on selection of a sharing menu to share the content of the first electronic device and at least one contact subscribing to the second service exists in at least one contact included in an address book of the first electronic device 201, the first electronic device 201 may provide a list including at least one contact subscribing to the second service. When selection of the contact of the first user is identified in a list of contacts subscribing to the first service, the first electronic device 201 may transmit first information including the content reception request and the request for generating the new channel for content output to the second server 330. The first electronic device 201 may insert account information (for example, an email address) of the first user included as the contact of the first user into the first information.

According to an embodiment, when the first user to share the content does not exist in the list including at least one contact subscribing to the second service, the first electronic device 201 may transmit account information of the first user input by the user to search for the first user to the second server 330. When it is identified that the first user has subscribed to the second service, based on subscription information of the first user received from the second server 330, the first electronic device 201 may transmit first information including the content reception request and the request for generating the new channel for content output to the second server 330, based on selection of the contact of the first user. The first electronic device 201 may include, in the first information, the account information (for example, the email address) of the first user included as the contact of the first user.

According to an embodiment, when the first user to share the content does not exist in the list including at least one contact subscribing to the second service, the first electronic device 201 may transmit the account information of the first user input by the user to the second server 330 to search for the first user and, when receiving information indicating that subscription information of the first user does not exist from the second server 330, transmit a message or email that recommends subscription to the second service to the first user, based on selection of the user.

According to an embodiment, when there is a history of previous sharing with the second service, the first electronic device 201 may display a sharing item previously shared with the second service in a sharing list displayed based on selection of the sharing menu.

According to various embodiments, the second server 330 may provide the second service that provides various types of content for respective channels to display devices of subscribers and receive first information including the content reception request and the request for generating the new channel for content output received from the first electronic device 201. The second server 330 may store, in the second server 330, content of the first electronic device 201 included in the first information, generate a new channel number for outputting the content, and generate second channel information including a channel name (for example, a user name of the first electronic device), a new channel number, and content information as channel information for outputting the content of the first electronic device. The second server 330 may store the second channel information to be correlated with storage location information of the content of the first external electronic device stored in the storage unit of the second server 330.

According to an embodiment, the second server 330 may provide the second service that provides, for respective channels, various types of content such as movies, soap operas, entertainments, and/or sports to the display device 410 (for example, TV) connected to the Internet.

According to an embodiment, when electronic program guide (EPG) data can be identified, the second server 330 may generate one channel list by combining a general broadcast channel reproduced through a TV tuner and a content broadcasting channel provided by the Internet through a set-top box and then generate a next channel number of the last channel number as a new channel number.

According to an embodiment, when electronic program guide (EPG) data cannot be identified, the second server 330 may generate a next channel number of the last channel number of the content broadcasting channel provided by the Internet through the set-top box as a new channel number.

According to an embodiment, the second server 330 may transmit newly generated second channel information to the display device 410 registered in the account information of the first user.

According to an embodiment, when a request for identifying whether the account information of the first user has subscribed to the second service is made by the first electronic device 201 having subscribed to the second service, the second server 330 may transmit subscription information of the first user to the first electronic device 201 when the account information of the first user exists, and may transmit information informing that subscription information of the first user does not exist to the first electronic device 201 when the account information of the first user does not exist.

According to an embodiment, the second server 330 may make a request for generating notification information informing of the generation of the second channel information newly generated to output of the content of the first electronic device to the first server 310.

According to an embodiment, when a request for transmitting content related to a channel number included in the second channel information is made by the display device 410, the second server 330 may detect the content of the first electronic device in the storage unit of the second server 330, based on storage location information of the content stored to be correlated with the second channel information, and transmit the detected content to the display device 410.

According to an embodiment the second server 330 may sequentially store the content of the first electronic device in the storage unit of the second server 330 in the order of reception and, when transmitting the content of the first electronic device to the display device 410 according to a request from the display device 410, sequentially transmit the content, starting with the last stored content.

According to an embodiment, when receiving first information including a request for receiving new content from the first electronic device 201 after generating the second channel information for outputting the content of the first electronic device, the second server 330 may store the new content of the first electronic device in the storage unit of the second server 330 and store the second channel information to be correlated with storage location information of the new content of the first electronic device stored in the storage unit of the first server 310. When transmitting the content of the first electronic device to the display device 410 according to a request from the display device 410, the second server 320 may output at least one previously stored content and then transmit at least one newly stored content according to the order of storage.

According to various embodiments, the first server 310 may provide a first service that manages a plurality of external devices registered for respective pieces of subscriber information and, when receiving a request for generating notification information informing of the generation of the second channel information newly generated to output the content of the first electronic device from the second server 330, generate notification information including a channel name (for example, a user name of the first electronic device), a new channel number, and content information, based on the second channel information included in the notification information, and transmit the notification information to the display device 410.

According to an embodiment, when the existence of the second electronic device 430 is identified among at least one external device registered in the account information of the first user, based on the account information of the first user, the first server 310 may transmit the notification information to the display device 410 of the first user and the second electronic device 430.

According to various embodiments, when receiving notification information informing of the generation of a new channel from the first server 310, the display device 410 may display notification information including a channel name (for example, a user name of the first electronic device), a new channel number, and content information on the display device 410 and, when identifying selection for switching to the new channel number, make a request for content related to the second channel information for outputting the content of the first electronic device to the second server 330. The display device 410 may make a request for content of the first electronic device stored to be correlated to the second channel information to the second server 330 and output the content received from the second server 330 to the display device 410.

According to an embodiment, when receiving the information making the request for switching to the new channel from the second electronic device 430 registered in the account information of the first user, the display device 410 may make a request for the content stored to be correlated with the second channel information to the second server 330 and output the content of the first electronic device received from the second server 330 to the display device 410.

According to an embodiment, the display device 410 may receive notification information from the first server 310 in a state in which power of the display device 410 is turned off, and display the notification information on the display device 410 after turning on power of the display device 410.

According to an embodiment, when receiving the information making the request for switching to the new channel from the second electronic device 430 registered in the account information of the first user in a state in which power of the display device 410 is turned off, the display device 410 may display the content received from the second server 330 on the display device 410 after turning on power of the display device 410.

According to an embodiment, the display device 410 may switch a channel number of the first electronic device through channel zapping or channel input and output content related to the second channel information of the first electronic device while the broadcast is output through the general broadcasting channel reproduced through the TV tuner or the content is output through the content broadcasting channel provided by the Internet through the set-top box.

According to various embodiments, when the second electronic device 430 receives notification information from the first server 310 as one of external devices registered in subscription information of the first user, the second electronic device 430 may display the notification information on the display of the second electronic device 430 and, when identifying selection for switching to the new channel number included in the notification information, transmit information making a request for switching to the new channel to the display device 410 of the first user.

Figure 4:
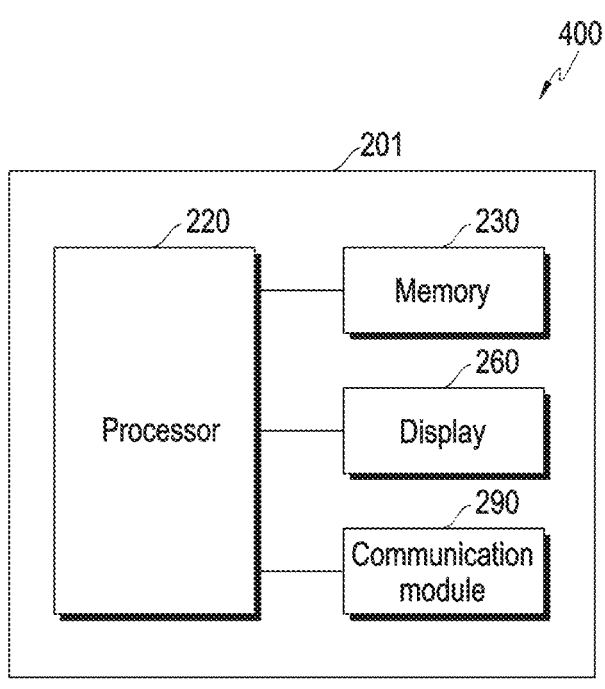
FIG. 4 is a block diagram of an example electronic device according to various embodiments.

FIG. 4 is a block diagram 400 of an example electronic device according to various embodiments.

Referring to FIG. 4, according to various embodiments, the electronic device 201 (for example, the electronic device 101 of FIG. 1, the electronic device 201 of FIG. 2, and/or the electronic device 201 of FIG. 3) may include a processor 220, memory 230, a display 260, and a communication module 290.

According to various embodiments, the processor 220 may be implemented to be substantially the same or similar to the processor 120 of FIG. 1.

According to various embodiments, a first user to share content stored in the first electronic device 201 has subscribed to a first service that manages at least one external device registered for each piece of subscriber information. When identifying that a display device (for example, the display device 410 of FIG. 2) of the first user is registered in a first server (for example, the first server 310 of FIG. 2) that provides the first service, the processor 220 may transmit first information including a content reception request and a request for generating a new channel for content output to the first server.

According to an embodiment, the processor 220 may insert account information of the first user and/or content into the first information.

According to an embodiment, the first information including the content reception request and the request for generating the new channel for content output may be transmitted to the display device (for example, the display device 410 of FIG. 2) of the first user through the first server.

According to an embodiment, the content included in the first information may be stored in the first server, and the first information including the request for generating the new channel for content output may be transmitted to the display device (for example, the display device 410 of FIG. 2) of the first user through the first server.

According to an embodiment, when identifying selection of the display device to share the content of the first electronic device in a sharing list displayed based on selection of a sharing menu after selecting the content to be shared, the processor 220 may identify whether at least one contact subscribing to the first service exists in at least one contact included in an address book of the electronic device 201. When at least one contact subscribing to the first service is identified in at least one contact included in the address book, the processor 220 may display a list including the at least one contact subscribing to the first service on the display 260. When selection of the contact of the first user is identified in the list including the contacts subscribing to the first service, the processor 201 may transmit the first information including the content reception request and the request for generating the new channel for content output to the first server. The processor 220 may include account information (for example, an email address) of the first user included as the contact of the first user in the first information.

According to an embodiment, when the first user to share the content does not exist in the list including at least one contact subscribing to the first service, the processor 220 may transmit the account information of the first user input by the user to the first server to search for the first user. The processor 220 may identify that the first user has subscribed to the first service, based on subscription information of the first user received from the first server 310 and that the display device (for example, the display device 410 of FIG. 2) of the first user is registered in the first server. The processor 220 may add the contact of the first user to the address book, based on the subscription information of the first user and transmit the first information including the content reception request and the request for generating the new channel for content output to the first server, based on selection of the contact of the first user. The processor 220 may include, in the first information, the account information (for example, the email address) of the first user included as the contact of the first user.

According to an embodiment, when the first user to share the content does not exist in the list including at least one contact subscribing to the first service, the processor 220 may transmit the account information of the first user input by the user to the first server 310 to search for the first user. The processor 220 may identify that the first user has subscribed to the first service, based on the subscription information of the first user received from the first server and that the display device (for example, the display device 410 of FIG. 2) of the first user is not registered in the first server. The processor 220 may transmit a message or email that recommends registration of the display device of the first user in the first server to the first user, based on selection of the user.

According to an embodiment, when the first user to share the content does not exist in the list including at least one contact subscribing to the first service, the processor 220 may transmit the account information of the first user input by the user to the first server 310 to search for the first user. When receiving information indicating that the subscription information of the first user does not exist from the first server, the processor 220 may transmit the message or email that recommends subscription to the first service and registration of the display device of the first user in the first server 310 to the first user, based on selection of the user.

According to an embodiment, when a history of previous sharing with the display device exists, the processor may display at least one sharing item previously shared with the display device in a sharing list displayed based on selection of a sharing menu through the display 260.

According to various embodiments, when the first user to share the content stored in the first electronic device 201 has subscribed to a second service that can provide various types of content for respective channel numbers, the processor 220 may transmit the first information including the content reception request and the request for generating the new channel for content output to a second server (for example, the second server 330 of FIG. 3).

According to an embodiment, the processor 220 may include, in the first information, account information of the first user and/or content.

According to an embodiment, the first information including the content reception request and the request for generating the new channel for content output may be transmitted to the second server to store the content in the second server and generate a new channel.

According to an embodiment, when the second service is selected from the sharing list displayed based on selection of the sharing menu to share the content of the first electronic device and at least one contact subscribing to the second service exists in at least one contact included in the address book of the first electronic device 201, the processor 220 may provide a list including at least one contact subscribing to the second service. When identifying selection of the contact of the first user in the list of the contacts subscribing to the first service, the processor 220 may transmit the first information including the content reception request and the request for generating the new channel for content output to the second server. The processor 220 may insert the account information (for example, the email address) of the first user included as the contact of the first user into the first information.

According to an embodiment, when the first user to share the content does not exist in the list including at least one contact subscribing to the second service, the processor 220 may transmit account information of the first user input by the user to the second server 330 to search for the first user. When identifying that the first user has subscribed to the second service, based on the subscription information of the first user received from the second server, the processor 220 may transmit the first information including the content reception request and the request for generating the new channel for content output, based on selection of the contact of the first user. The processor 220 may include, in the first information, the account information (for example, the email address) of the first user included as the contact of the first user.

According to an embodiment, when the first user to share the content does not exist in the list including at least one contact subscribing to the second service, the processor 220 may transmit the account information of the first user input by the user to the second server to search for the first user and, when receiving information indicating that the subscription information of the first user does not exist from the second server, transmit a message or email that recommends subscription to the second service to the first user, based on selection of the user.

According to an embodiment, when a history of previous sharing with the second service exists, the processor 220 may display at least one sharing item previously shared with the second service in a sharing list displayed based on selection of a sharing menu on the display 260.

According to various embodiments, the memory 230 may be implemented to be substantially the same or similar to the memory 130 of FIG. 1.

According to an embodiment, various types of content may be stored in the memory 230.

According to various embodiments, the display 260 may be implemented to be substantially the same or similar to the display module 180 of FIG. 1.

According to an embodiment, at least one icon indicating at least one sharing application may be displayed on the display 260.

According to an embodiment, a list including at least one contact subscribing to the first service and corresponding to at least one user registered in the first server that provides the first service may be displayed on the display 260.

According to an embodiment, a list including at least one contact subscribing to the second service may be displayed on the display 260.

According to various embodiments, the communication module 290 may be implemented to be substantially the same or similar to the communication module 190 of FIG. 1 and may include a plurality of communication circuits using different communication technologies.

According to an embodiment, the communication module 290 may include a plurality of communication circuits, including at least one of a WLAN module (not shown) and a short-range communication module (not shown), and including a UWB communication module, a Wi-Fi communication module, a near field communication (NFC) module, a Bluetooth legacy communication module and/or a Bluetooth low energy (BLE) communication module as the short-range communication module.

FIGS. 5A, 5B, 5C, and 5D are diagrams 500a, 500b, 500c, and 500d illustrating an example operation in which an example electronic device selects a target to be shared using a first service according to various embodiments.

Figures 5A, 5B:
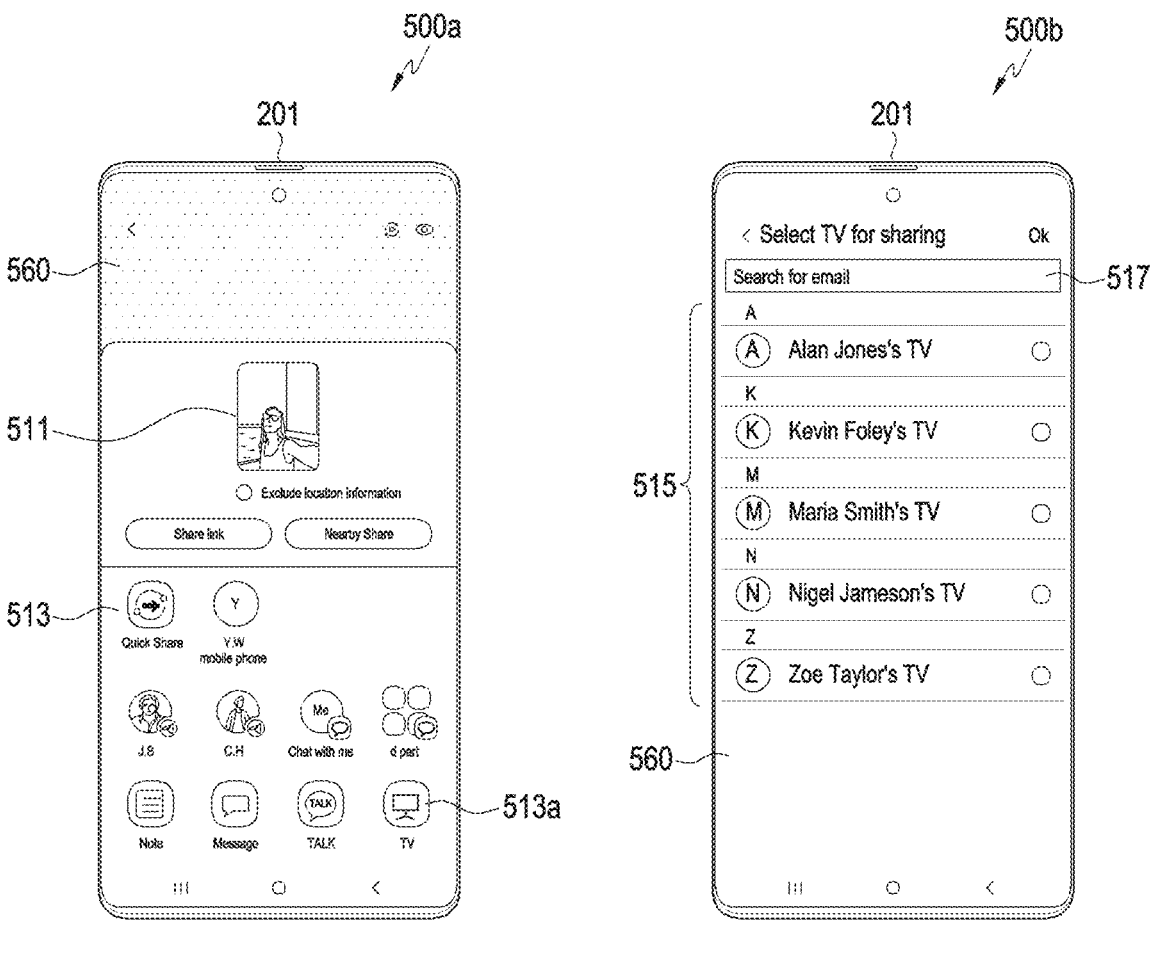
FIGS. 5A, 5B, 5C, and 5D are diagrams illustrating example operations in which an example electronic device selects a target to be shared using a first service according to various embodiments.

As illustrated in FIG. 5A, when a sharing menu for sharing content is selected after content 511 to be shared is selected from among at least one content stored in memory (for example, the memory 230 of FIG. 4) of the electronic device, the electronic device 201 (for example, the electronic device 201 of FIG. 2 and/or the electronic device 201 of FIG. 4) may display, on the display 560 (for example, the display 260 of FIG. 4) of the electronic device, the content 511 and a sharing list 513 including at least one icon indicating at least one sharing application capable of sharing the content. When selection of a first icon 513a indicating sharing of the content through the display device is identified in the sharing list 513 from among at least one icon indicating at least one sharing application, the electronic device 201 may identify whether contacts subscribing to the first service provided by a first server (for example, the first server 310 of FIG. 2) exist in at least one contact stored in the address book of the electronic device.

As illustrated in FIG. 5B, when at least one contact subscribing to the first service provided by the first server (for example, the first server 310 of FIG. 2) exists in at least one contact stored in the address book of the electronic device, the electronic device 201 (for example, the electronic device 201 of FIG. 2 and/or the electronic device 201 of FIG. 4) may display a first list 515 including at least one contact subscribing to the first service on the display. The electronic device may display, on the display 560, the first list 515 including a name of a display device registered in the first server providing the first service to which users corresponding to at least one contact subscribing to the first service subscribe. When identifying selection of at least one display device in the first list 515, the electronic device 201 may transmit first information including a content reception request and a request for generating a new channel for content output to the first server.

Figures 5C, 5D:
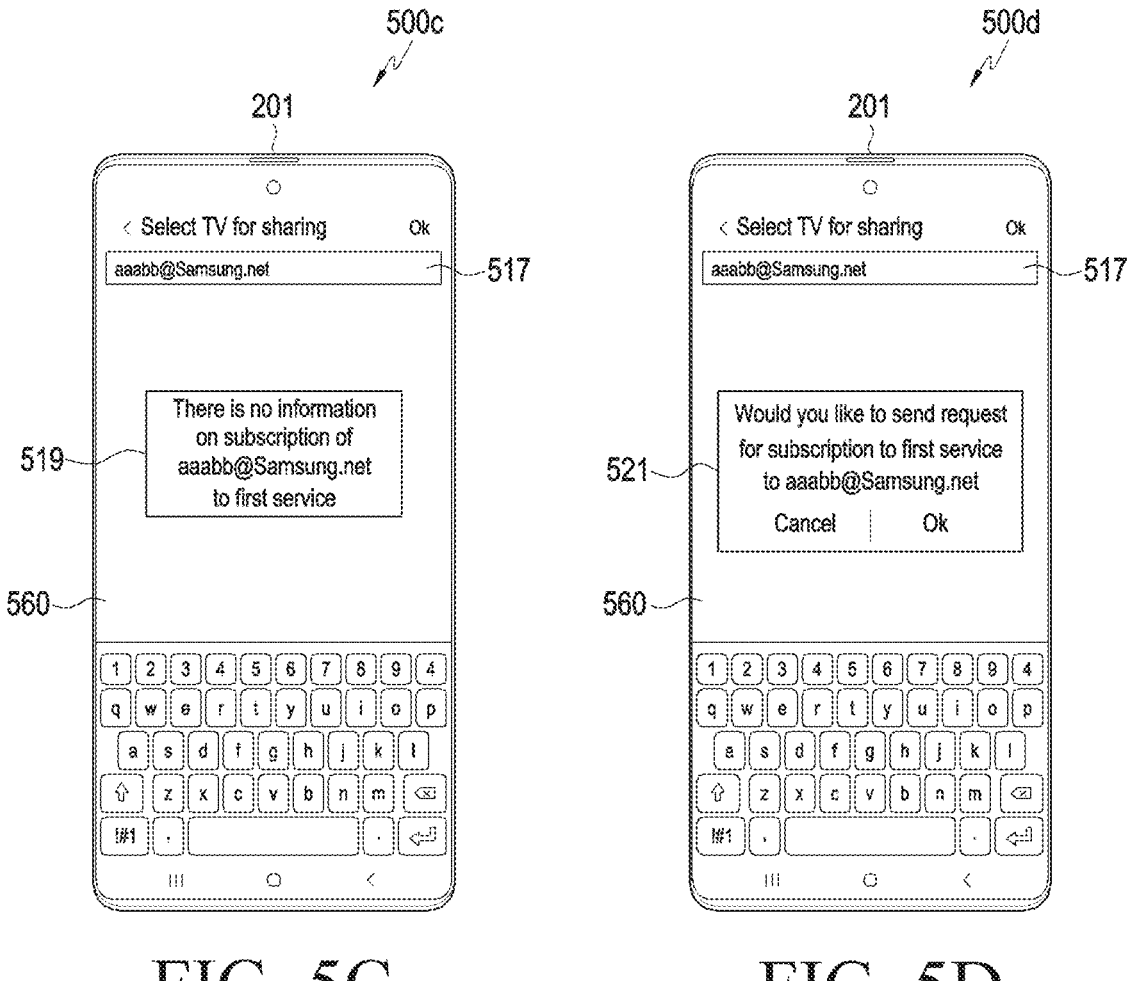

As illustrated in FIG. 5C, when identifying an input of an email address of the first user as account information of the first user input into a search field 517 by the user to search for the first user as the display device of the first user which the user desires to share does not exist in the first list 515, the electronic device 201 (for example, the electronic device 201 of FIG. 2 and/or the electronic device 201 of FIG. 4) may transmit information making a request for identifying a subscription of the first user for identifying whether the first user subscribes together with the email address of the first user. When receiving information indicating that subscription information of the first user does not exist from the first server, the electronic device 201 may display a popup window 519 indicating that the first user does not subscribe to the first service on the display 560.

As illustrated in FIG. 5D, the electronic device 201 (for example, the electronic device 201 of FIG. 2 and/or the electronic device 201 of FIG. 4) may display a popup window 521 asking about whether to transmit email that recommends subscription to the first service on the display 560. When "Ok" is selected in the popup window 521, the electronic device 201 may transmit a message making a request for subscribing to the first service to the email address of the first user.

FIGS. 6A, 6B, 6C, and 6D are diagrams 600a to 600d illustrating an example operation in which an example electronic device selects a target to be shared using a second service according to various embodiments.

Figures 6A, 6B:
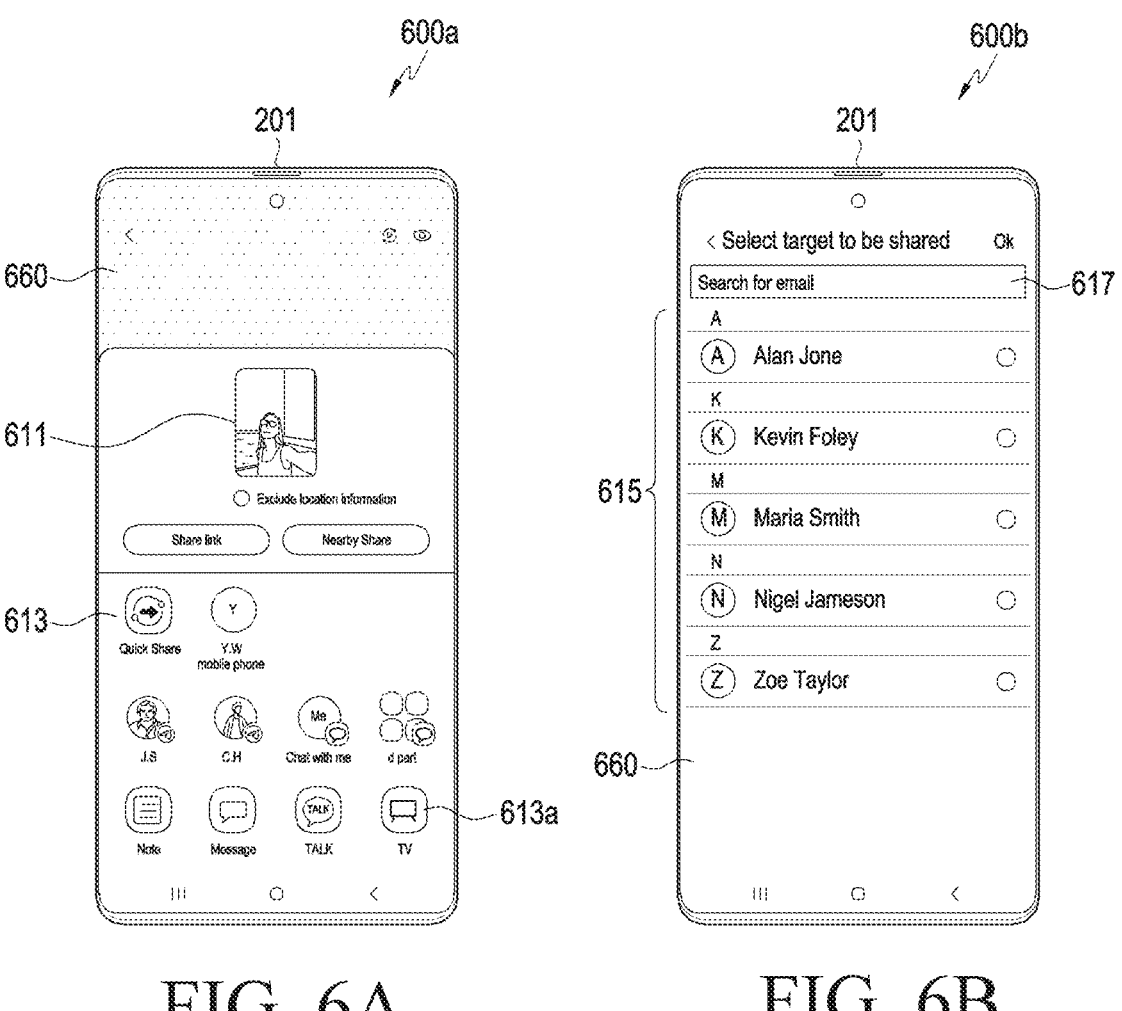

As illustrated in FIG. 6A, when a sharing menu for sharing content is selected after the content 611 to be shared is selected from among at least one content stored in memory (for example, the memory 230 of FIG. 4) of the electronic device, the electronic device 201 (for example, the electronic device 201 of FIG. 2 and/or the electronic device 201 of FIG. 4) may display the selected content 611 and a sharing list 613 including at least one icon indicating at least one sharing application capable of sharing the content on a display 660 (for example, the display 260 of FIG. 4) of the electronic device. When selection of a second icon 613a indicating sharing of the content through the second service provided by a second server (for example, the second server 330 of FIG. 3) is identified in the sharing list 613 among at least one icon indicating at least one sharing application, the electronic device 201 may identify whether contacts subscribing to the second service provided by the second server exist in at least one contact stored in the address book of the electronic device.

As illustrated in FIG. 6B, when at least one contact subscribing to the second service provided by the second server (for example, the second server 330 of FIG. 3) exists in at least one contact stored in the address book of the electronic device, the electronic device 201 (for example, the electronic device 201 of FIG. 2 and/or the electronic device 201 of FIG. 4) may display a second list 615 including at least one contact subscribing to the second service on the display 260. When identifying selection of at least one contact in the second list 615, the electronic device 201 may transmit first information including a content reception request and a request for generating a new channel for content output to the second server.

As illustrated in FIG. 6C, when identifying an input of an email address of the first user as account information of the first user input into a search field 617 by the user to search for the first user as a display device of the first user which the user desires to share does not exist in the first list 515, the electronic device 201 (for example, the electronic device 201 of FIG. 2 and/or the electronic device 201 of FIG. 4) may transmit information making a request for identifying whether the first user subscribes together with the email address of the first user to the second server (for example, the second server 330 of FIG. 3). When receiving information indicating that subscription information of the first user does not exist from the second server, the electronic device 201 may display a popup window 619 indicating that the first user does not subscribe to the second service on the display 660.

As illustrated in FIG. 6D, the electronic device 201 (for example, the electronic device 201 of FIG. 2 and/or the electronic device 201 of FIG. 4) may display a popup window 621 asking about whether to transmit email that recommends subscription to the second service on the display 660. When "Ok" is selected in the popup window 621, the electronic device 201 may transmit a message making a request for subscribing to the second service to the email address of the first user.

Figure 7:
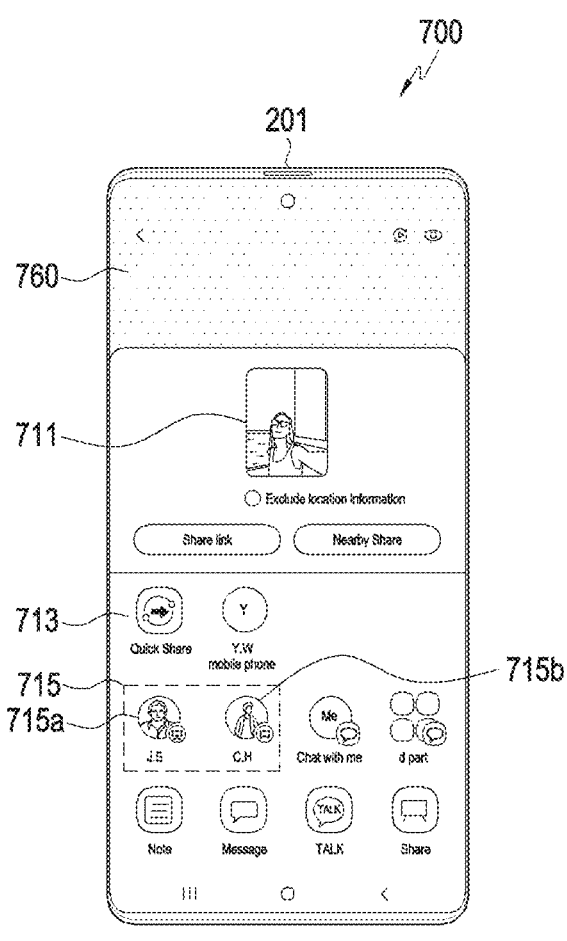
FIG. 7 illustrates an example operation of selecting a target to be shared based on a sharing history according to various embodiments.

FIG. 7 is a diagram 700 illustrating an example operation for selecting a target to be shared based on a sharing history according to various embodiments.

Referring to FIG. 7, when a sharing menu for sharing content is selected after the content 511 to be shared is selected from among at least one content stored in memory (for example, the memory 230 of FIG. 4) of the electronic device and the existence of a history of previous sharing with the display device or the second service is identified, the electronic device 201 (for example, the electronic device 201 of FIG. 2 and/or the electronic device 201 of FIG. 4) may the selected content 711 and display, on a display 760, a sharing list 713 including at least one icon indicating at least one sharing application capable of sharing the content together with at least one sharing item 715 previously shared with the display device. When identifying selection of a first sharing item 715a sharing the content 711 with the display device of the first user from among at least one sharing item 715, the electronic device 201 may transmit the content 711 to a first server (for example, the first server 310 of FIG. 2) or the display device 410 of the first user through the first server in order to allow the first server or the display device 410 of the first user to additionally store the content as the content 711 related to channel information (for example, first channel information) generated by a name of the first user. When selection of a second sharing item 715b shared through the second service to which the first user subscribes is identified from among at least one sharing item 715, the electronic device 201 may transmit the content 711 to the second server (for example, the second server 330 of FIG. 3) to allow the second server to additionally store the content as the content 711 related to channel information (for example, second channel information) generated by the name of the first user.

Figure 8A:
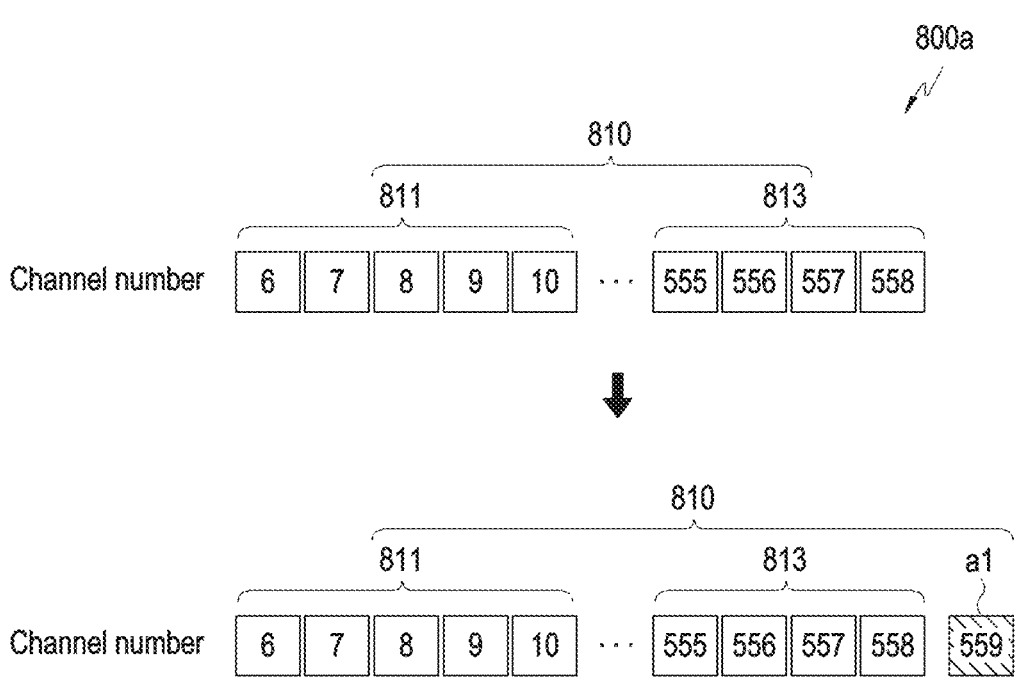
FIGS. 8A and 8B illustrate an example operation in which the display device adds a channel according to various embodiments.
Figure 8B:
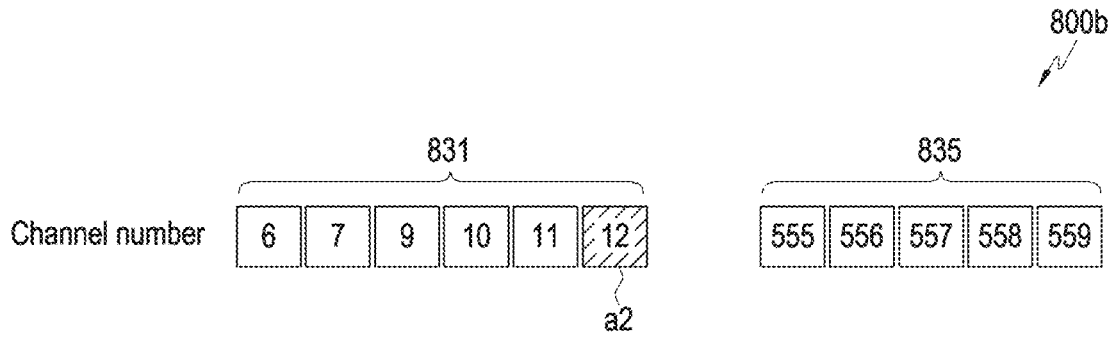

FIGS. 8A and 8B are diagrams 800*a* and 800*b* illustrating an example operation in which an example display device adds a channel according to various embodiments.

Referring to FIG. 8A, when electronic program guide (EPG) data can be identified, a display device (for example, the display device 410 of FIG. 2) which may receive first information including a request for generating a new channel for content output through a first server (for example, the first server 310 of FIG. 2) may generate one channel list 810 by combining a general broadcasting channel 811 reproduced through a TV tuner and a content broadcasting channel 813 provided by the Internet through a set-top box. The display device may generate a new channel number a1 (for example, channel number 559) as a next channel number of the last channel number (for example, channel number 558) in the channel list 810.

Referring to FIG. 8B, when electronic program guide (EPG) data cannot be identified, a display device (for example, the display device 410 of FIG. 2) which may receive first information including a request for generating a new channel for content output through a first server (for example, the first server 310 of FIG. 2) may generate a new channel number a2 (for example, channel number 12) as a next channel number of the last channel number (for example, channel number 11) of the general broadcasting channel 813 reproduced through the TV tuner between the general broadcasting channel 831 reproduced through the TV tuner and the content broadcasting channel 833 provided by the Internet through the set-top box.

When it is possible to generate a new channel in the general broadcasting channel reproduced through the TV tuner and the content broadcasting channel provided by the Internet through the set-top box, the display device (for example, the display device 410 of FIG. 2) may additionally generate a new channel number as a next channel number of the last channel number of the general broadcasting channel or additionally generate a new channel number as a next channel number of the last channel number of the content broadcasting channel, based on a priority.

Figure 9A:
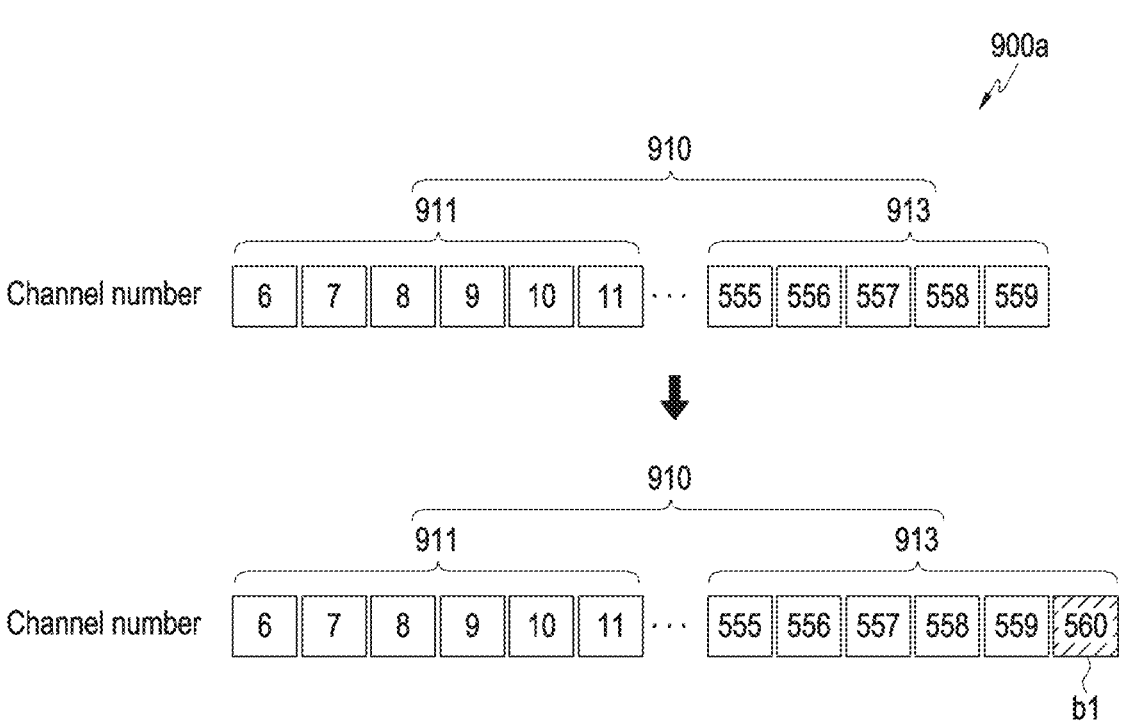
FIGS. 9A and 9B illustrate an example operation in which the display device adds a channel according to various embodiments.
Figure 9B:
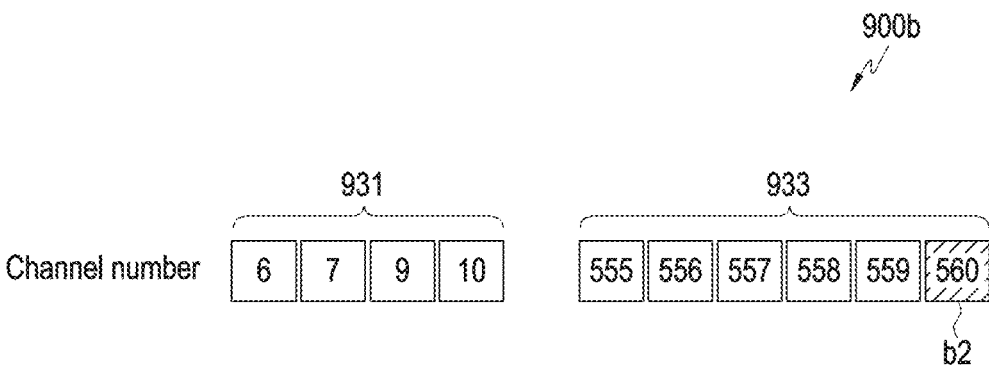

FIGS. 9A and 9B are diagrams 900*a* and 900*b* illustrating an example operation in which an example display device adds a channel according to various embodiments.

Referring to FIG. 9A, when electronic program guide (EPG) data can be identified, a second server (for example, the second server 330 of FIG. 3) providing a second service may generate one channel list 910 by combining a general broadcasting channel 911 reproduced through a TV tuner and a content broadcasting channel 913 provided by the Internet through a set-top box. The second server may generate a new channel number b1 (for example, channel number 560) as a next channel number of the last channel number (for example, channel number 559) in the channel list 910.

Referring to FIG. 9B, when electronic program guide (EPG) data cannot be identified, a second server (for example, the second server 330 of FIG. 3) providing a second service may generate a new channel number b2 (for example, channel number 560) as a next channel number of the last channel number (for example, channel number 559) of the content broadcasting channel 933 provided by the Internet through the set-top box between the general broadcasting channel 931 reproduced through the TV tuner and the content broadcasting channel 933 provided by the Internet through the set-top box.

When it is possible to generate a new channel in the general broadcasting channel reproduced through the TV tuner and the content broadcasting channel provided by the Internet through the set-top box, the second server (for example, the second server 330 of FIG. 3) may additionally generate a new channel number as a next channel number of the last channel number of the general broadcasting channel or additionally generate a new channel number as a next channel number of the last channel number of the content broadcasting channel, based on a priority.

Figure 10A:
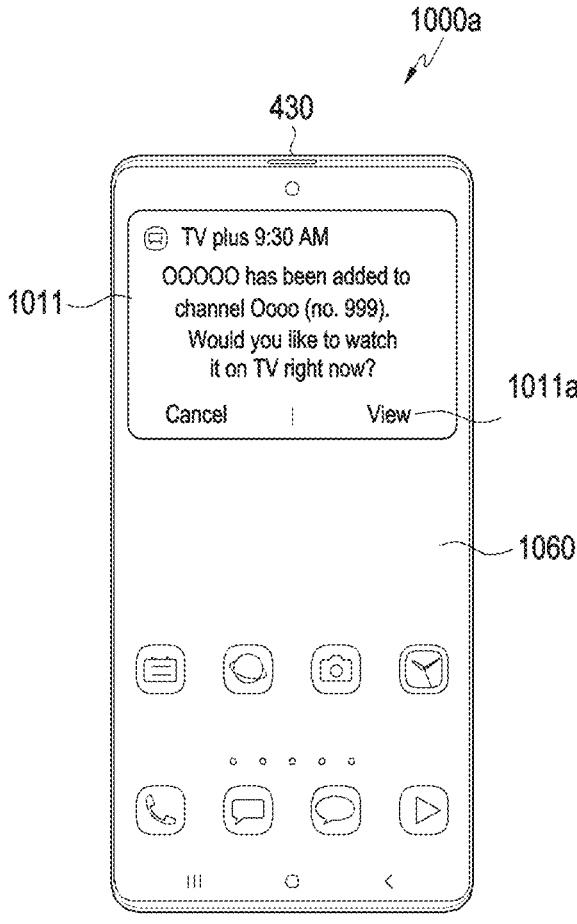
FIGS. 10A, 10B, and 10C illustrate output of notification information in an example system according to various embodiments.
Figure 10B:
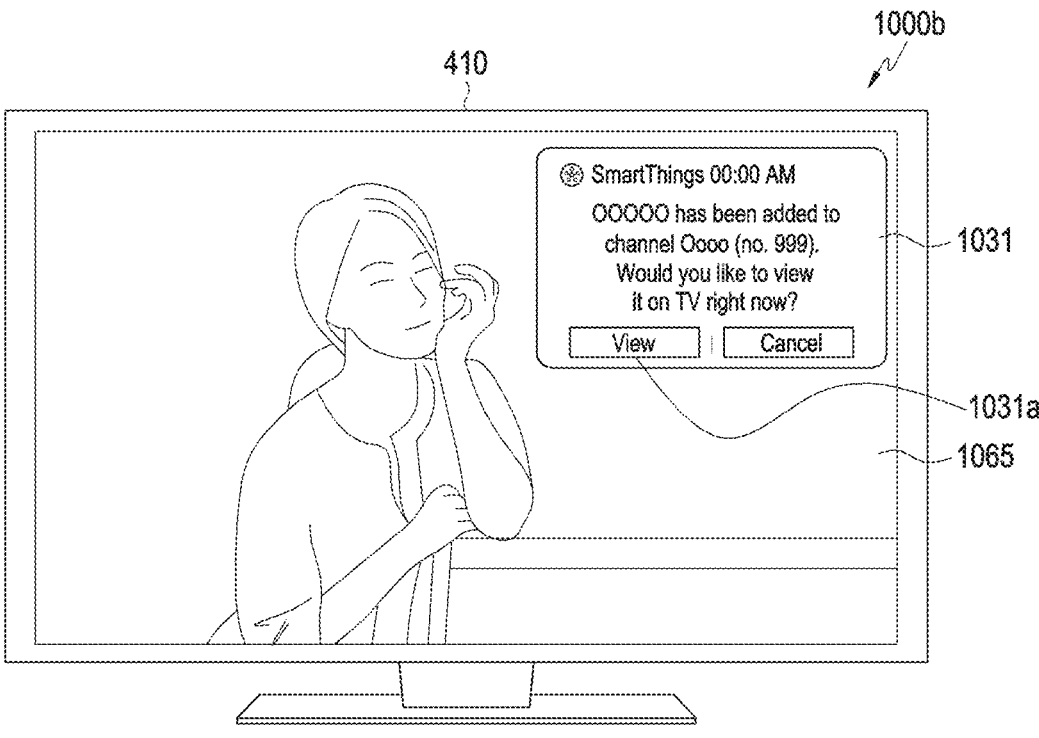
Figure 10C:
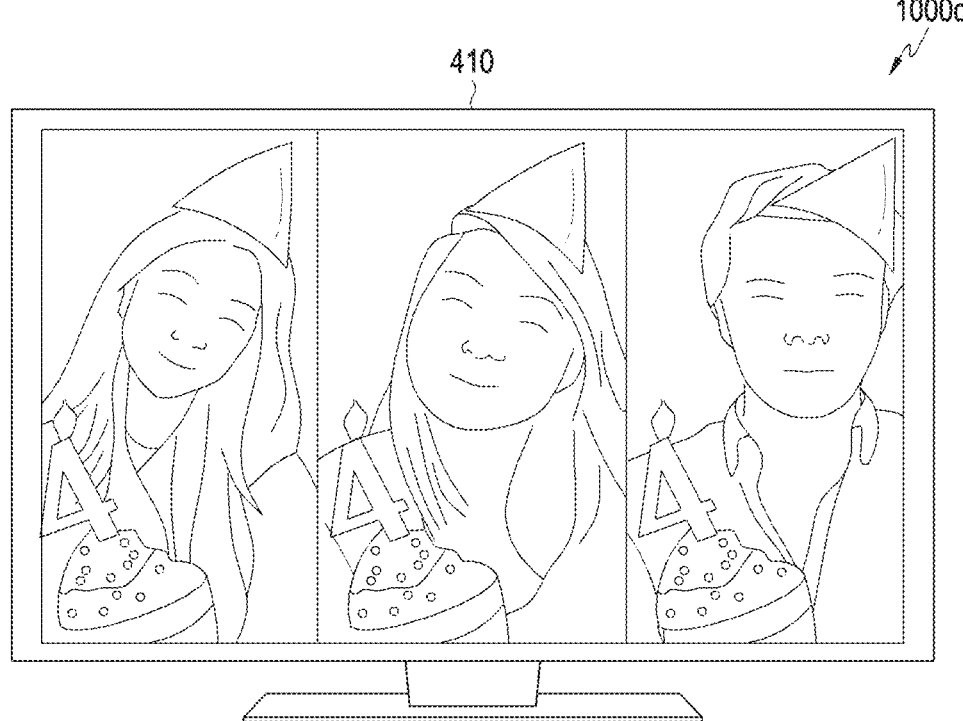

FIGS. 10A, 10B, and 10C are diagrams 1000*a*, 100*b*, and 1000*c* illustrating example output of notification information in an example system according to various embodiments.

Referring to FIGS. 10A and 10C, as illustrated in FIG. 10A, when receiving notification information from a first server (for example, the first server 310 of FIG. 2), the electronic device 430 (for example, the second electronic device 430 of FIG. 2) may display the notification information through a popup window 1011 on a display 1060 of the electronic device 430 and, when identifying selection 1011*a* of switching to a new channel number included in the notification information, transmit information making a request for switching to the new channel number to a display device (for example, the display device 410 of FIG. 2) registered in account information of a user (for example, the first user) of the electronic device.

As illustrated in FIG. 10B, when receiving information making a request for switching to a new channel number from the electronic device 430 registered in account information of a user (for example, the first user), the display device 410 (for example, the display device 410 of FIG. 2) may identify channel information (for example, first channel information), based on a channel name and a channel number included in the request information. The display device 410 may switch the channel to the channel number included in the channel information (for example, the first channel information), detect content stored to be correlated with the first channel information in the display device 410 or the first server, based on storage location information of the content stored to be correlated with the first channel information, and output the detected content to a display 1065 of the display device 410.

Referring to FIGS. 10B and 10C, as illustrated in FIG. 10B, when receiving notification information from a first server (for example, the first server 310 of FIG. 2), the display device 410 (for example, the display device 410 of FIG. 2) may display the notification information through a popup window 1031 on the display 1065 of the display device 410 and identify selection 1031*a* of switching to the new channel number included in the notification information.

When identifying that the content of the first electronic device is stored in the first server 310, the display device 410 may make a request for content stored to be correlated with the first channel information generated to output the content of the first electronic device to the first server 310 and output the content received from the first server 310 to the display device 410.

As illustrated in FIG. 10C, the display device 410 (for example, the display device 410 of FIG. 2) may identify channel information (for example, first channel information), based on the channel name and the channel number included in the notification information and switch to the channel number included in the channel information (for example, the first channel information). The display device 410 may detect content stored to be correlated with the first channel information in the display device 410 or the first server, based on storage location information of the content stored to be correlated with the first channel information and output the detected content to the display 1065 of the display device 410.

Figure 11:
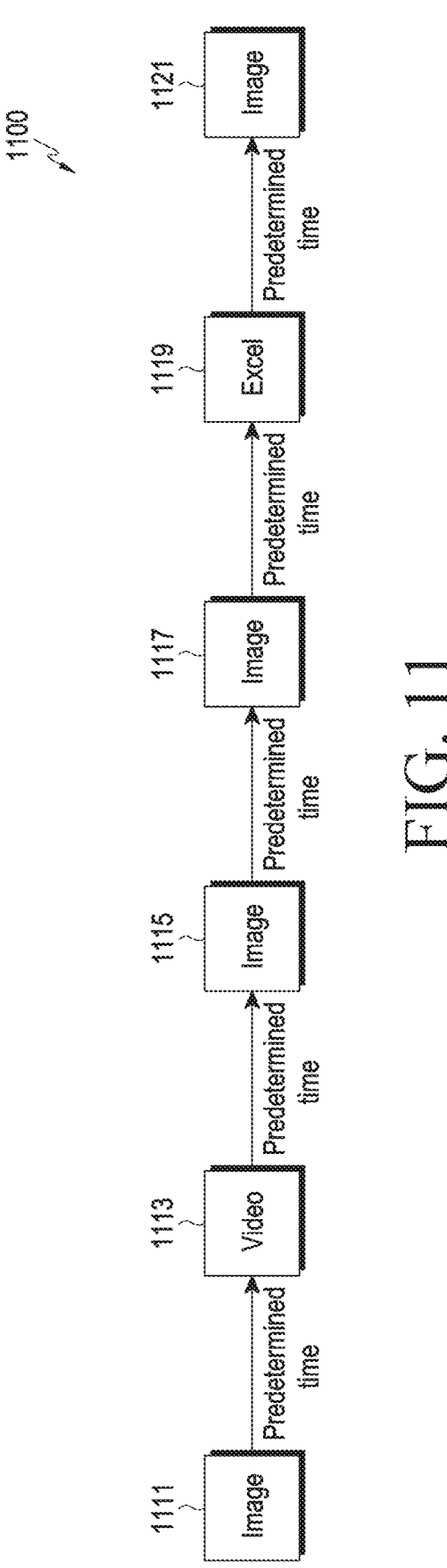
FIG. 11 illustrates an example operation in which an example display device or an example second server outputs content according to the type thereof according to various embodiments.

FIG. 11 is a diagram 1100 illustrating an example operation in which an example display device or an example second server performs the output for each type of content according to various embodiments.

Referring to FIG. 11, the display device (for example, the display device 410 of FIG. 2) or the second server (for example, the second server 330 of FIG. 3) may automatically reproduce content stored to be correlated with channel information and, when various types of content such as an image, a video, and an excel file are mixed, output the content to the display device in the order of storage. When a predetermined time passes while an image 1111 is displayed on the display of the display device, the display device or the second server may reproduce a video 1113. When a predetermined time passes after reproduction of the video 1113 is completed, the display device or the second server may display an image 1115, when a predetermined time passes while the image 1115 is displayed, display an image 1117, and, when a predetermined time passes while the image 1117 is displayed, display an excel file 1119. When a predetermined time passes while the excel file 1119 is displayed, the display device or the second server may display an image 1121 and, when a predetermined time passes while the image 1121 is displayed, stop outputting the content or sequentially output the content, starting with the image 111, again.

Types of the content which can be reproduced by the display device (for example, the display device 410 of FIG. 2) or the second server (for example, the second server 330 of FIG. 3) may be as shown in, for example, [Table 1] below, and [Table 1] shows the types of content and types of keys which can be controlled by the display device for each type of content.

410 of FIG. 2) or the second server (for example, the second server 330 of FIG. 3) may store the plurality of first content (1210) to be correlated with channel information (for example, first channel information or second channel information) in the order of "1→2→3→4" corresponding to the reception order. When reproducing the content related to the channel information, the display device or the second server may display the plurality of first content (1210) on the display of the display device in the order of "4→3→2→1", starting with the last stored content.

Thereafter, when receiving a plurality of second content (1230) A, B, C, and D from the electronic device (for example, the first electronic device 201 of FIGS. 2 to 3), the display device (for example, the display device 410 of FIG. 2) or the second server (for example, the second server 330 of FIG. 3) may store the plurality of second content (1230) to be correlated with the channel information (for example, first channel information or second channel information) in the order of "A→B→C→D" corresponding to the reception order when storing the plurality of second content (1230) after the plurality of first content (1210). When reproducing the content related to the channel information, the display device or the second server may display the plurality of first content (1210) on the display of the display device in the order of "4→3→2→1", starting with the last stored content and, when displaying of the plurality of first content (1210) is completed, display the plurality of second content (1230) on the display of the display device in the order of "D→C→B→A", starting with the last stored content.

Figure 13A:
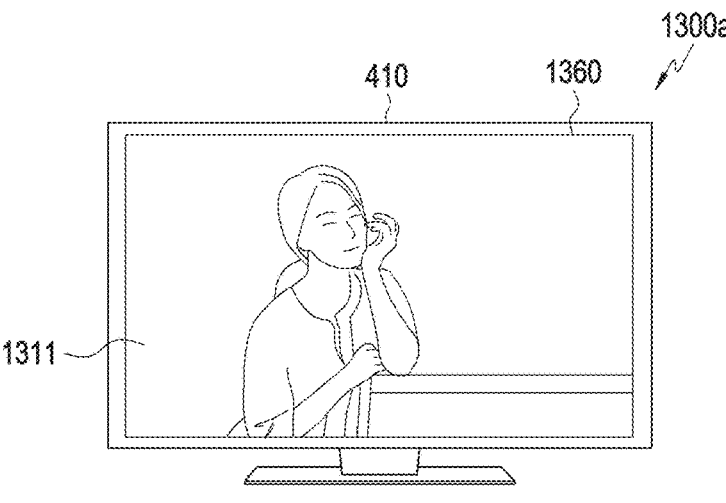
FIGS. 13A, 13B, and 13C illustrate an example operation in which an example display device displays content according to various embodiments.
Figure 13B:
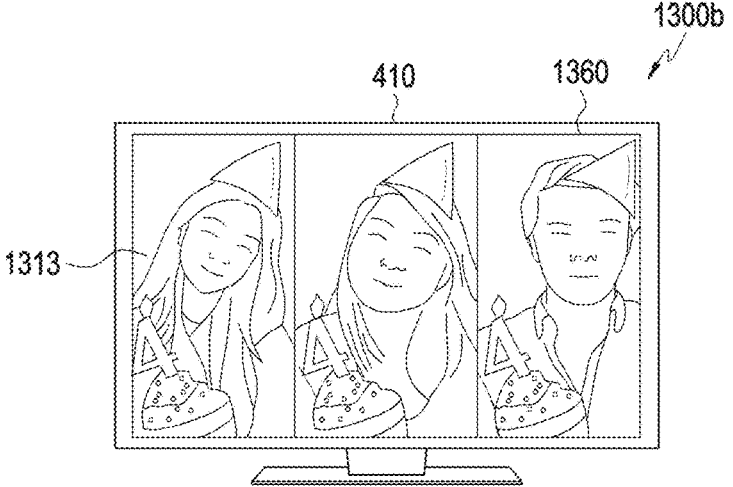
Figure 13C:
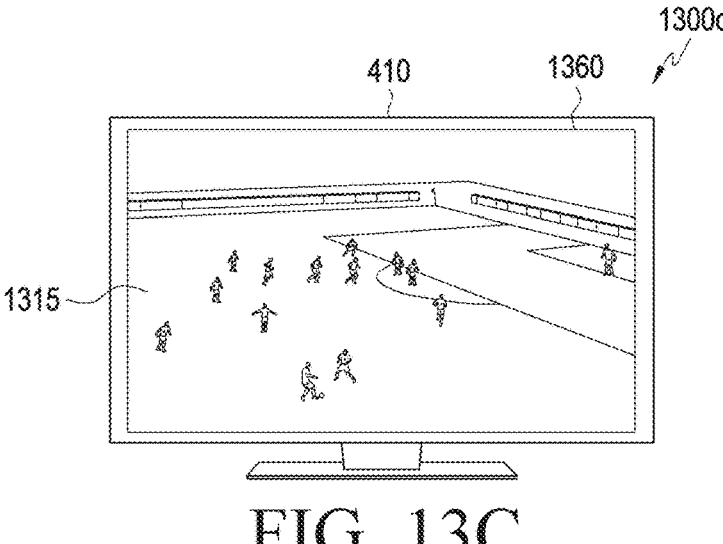

FIGS. 13A, 13B, and 13C are diagrams 1300*a*, 1300*b*, and 1300*c* illustrating an example operation in which an example display device displays content according to various embodiments.

As illustrated in FIG. 13A, the display device 410 (for example, the display device 410 of FIG. 2) may output content 1311 corresponding to a channel number reproduced through a TV tuner to the display 1360.

As illustrated in FIG. 13B, when identifying selection of channel up using a TV remote control to move a channel

TABLE 1

| Type | Image | Video | PPT | Excel | PDF | PDF |
|---|---|---|---|---|---|---|
| Reproduction method | Slide Show | Automatic reproduction | Slide Show | View entire screen (screen adjustment) Maintain screen to be equal to slide show configuration time next tab (or content) after predetermined time | Slide Show | First page (screen adjustment) - after maintain screen to be equal to slide show configuration time, next page after predetermined time |
| Key type | Enter: Play/Pause Left and right: Prev/Next | Enter: Play/Pause Left and right: Prev/Next Left and right: Long Tab: Rewind/Past Forward | Enter: Play/Pause Left and right: Prev/Next | Enter: NR Left and right: Prev/Next | Enter: Play/Pause Left and right: Prev/Next | Left and right: Prev/Next |

Figure 12:
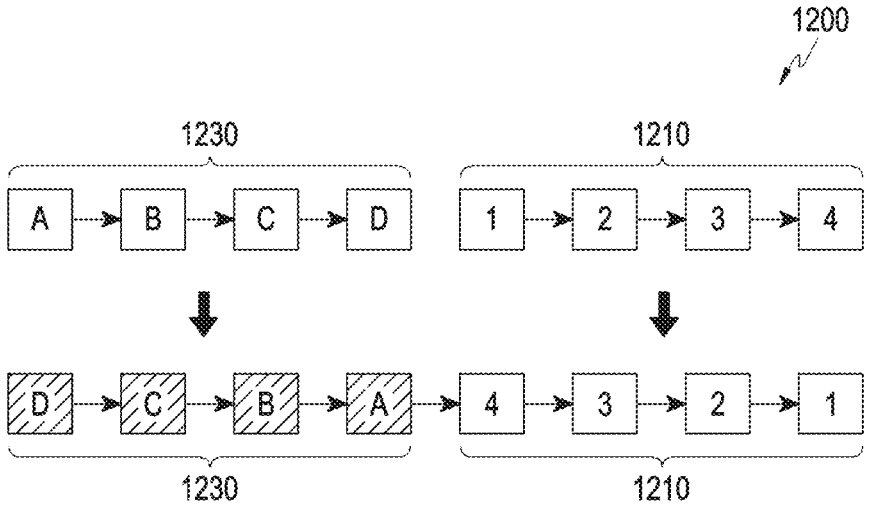
FIG. 12 illustrates an example operation of an output order of content by an example display device or an example second server according to various embodiments.

FIG. 12 is a diagram 1200 illustrating an example operation for the output order of content by an example display device or an example second server according to various embodiments. Referring to FIG. 12, when receiving a plurality of first content (1210) 1, 2, 3, and 4 from the electronic device (for example, the first electronic device 201 of FIGS. 2 to 3), the display device (for example, the display device number while the content 1311 corresponding to the channel number reproduced through the TV tuner is output to the display 1360, if a channel number corresponding to a first channel number which is the next channel number of the channel number is a name of a first user, the display device 410 (for example, the display device 410 of FIG. 2) may detect content 1313 stored to be correlated with channel information including the first channel number and the name of the first user and display the detected content on the display 1360.

As illustrated in FIG. 13C, when identifying selection of channel up using a TV remote control to move a channel number while the content 1313 stored to be correlated with the channel information including the first channel number and the name of the first user as the channel name on the display 1360, if the channel name corresponding to a second channel number which is the next channel number of the first channel number is a name of a second user, the display device 410 (for example, the display device 410 of FIG. 2) detects content 1315 stored to be correlated with the channel information including the second channel number and the name of the second user and display the detected content on the display 1360.

FIGS. 13A and 13B illustrate, as an example, that the content 1313 stored to be correlated with the channel information including the first channel number and the name of the first user as the channel name and the content 1314 stored to be correlated with the channel number including the second channel number and the name of the second user as the channel name are displayed on the display of the display device 410 through channel up/down and channel control using the TV remote control, but the content 1313 stored to be correlated with the channel information including the first channel number and the name of the first user as the channel name and the content 1314 stored to be correlated with the channel number including the second channel number and the name of the second user as the channel name may be also displayed on the display 1360 of the display device 410, based on a direct input of the channel number using the TV remote control.

Figure 14A:
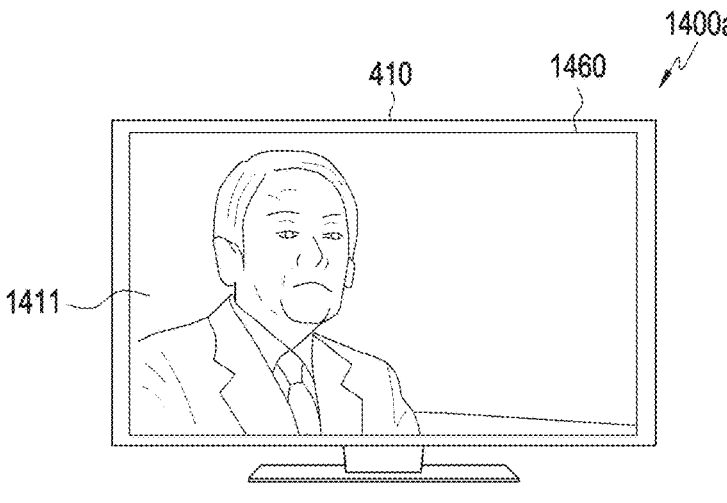
FIGS. 14A, 14B, and 14C illustrate an example operation in which an example display device displays content according to various embodiments.
Figure 14B:
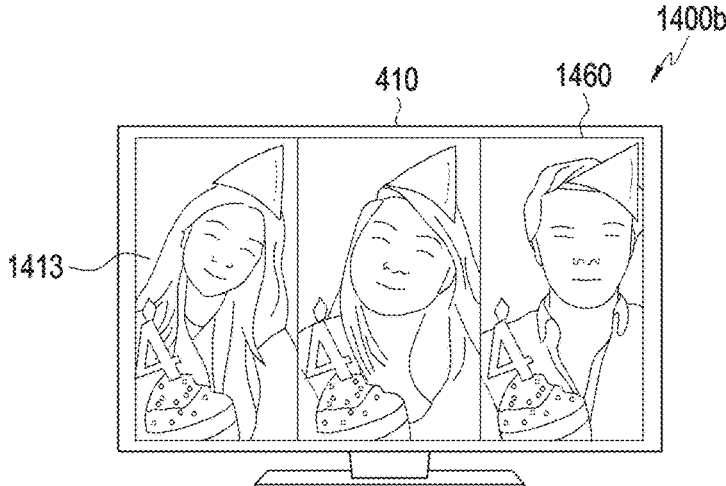
Figure 14C:
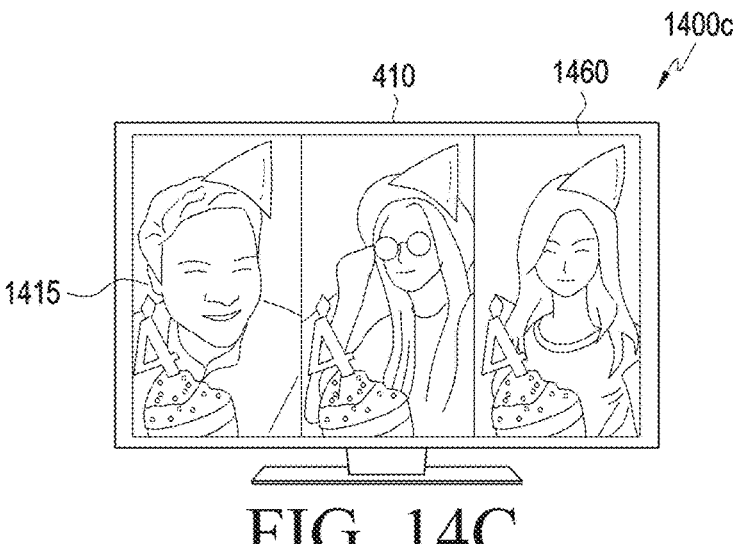

FIGS. 14A, 14B, and 14C are diagrams 1400a, 1400b, and 1400c illustrating an example operation in which an example display device displays content according to various embodiments.

As illustrated in FIG. 14A, the display device 410 (for example, the display device 410 of FIG. 2) may output content 1411 corresponding to a channel number provided by the Internet through a set-top box to the display 1460.

As illustrated in FIG. 14B, when identifying selection of channel up using a TV remote control to move a channel number while the content 1411 corresponding to a channel number provided by the Internet through a set-top box is output to the display 1460, if a channel name corresponding to a first channel number which is the next channel number of the channel number is a name of a first user, the display device 410 (for example, the display device 410 of FIG. 2) detects content 1413 stored to be correlated with channel information including the first channel number and the name of the first user and displays the detected content on the display 1460.

As illustrated in FIG. 14C, when identifying selection of reproduction (playback) using the TV remote control while the content 1413 stored to be correlated with the channel information including the first channel number and the name of the first user as the channel name is output to the display 1460, the display device 410 (for example, the display device 410 of FIG. 2) may output next content 1415 connected to the content 1413 to the display 1460. When the type of the content 1413 is a video, the display device 410 may reproduce the video, based on selection of reproduction (playback) using the TV remote control and output the next content 1415 connected to the content 1413 to the display 1460.

Figure 15A:
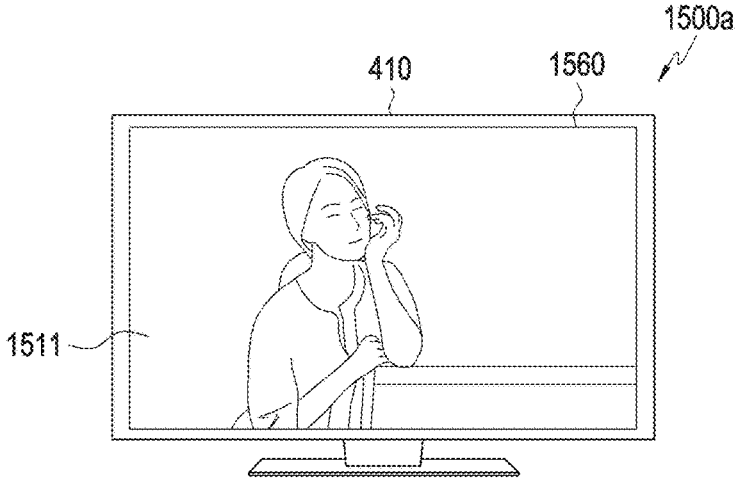
FIGS. 15A, 15B, and 15C illustrate an example operation in which an example display device displays content according to various embodiments.
Figure 15B:
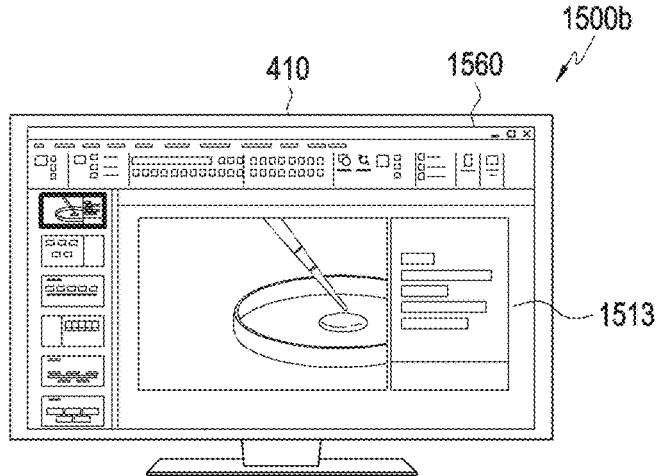
Figure 15C:
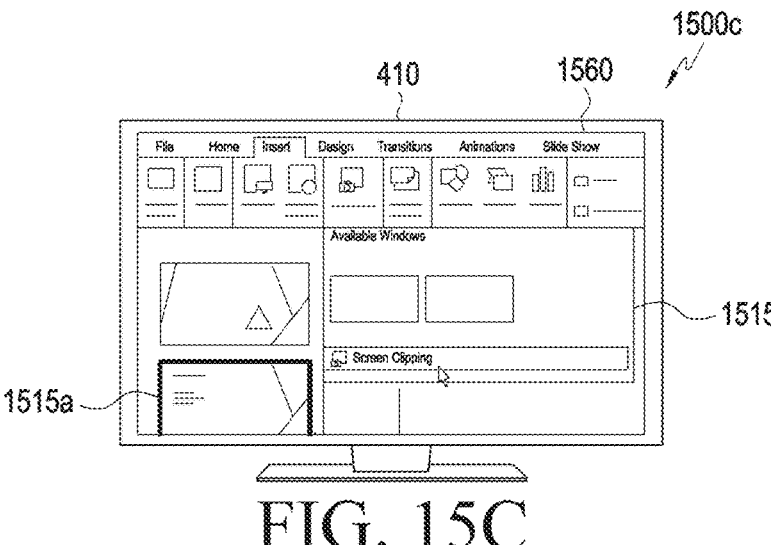

FIGS. 15A, 15B, and 15C are diagrams 1500a, 1500b, and 1500c illustrating an example operation in which an example display device displays content according to various embodiments.

As illustrated in FIG. 15A, the display device 410 (for example, the display device 410 of FIG. 2) may output content 1511 corresponding to a channel number reproduced through a TV tuner on the display 1560.

As illustrated in FIG. 15B, when identifying selection of channel up using a TV remote control to move a channel number while the content 1511 corresponding to a channel number reproduced through a TV tuner is output to the display 1560, if a channel name corresponding to a first channel number which is the next channel number of the channel number is a name of a first user, the display device 410 (for example, the display device 410 of FIG. 2) detects content stored to be correlated with channel information including the first channel number and the name of the first user and displays the detected content on the display 1560. When the type of the content is PowerPoint (PPT), the display device 410 may execute a TV viewer and display a first page 1513 of the content on the display 1560.

Referring to FIG. 15C, when identifying selection 1515a of a second page of the content using a navigation key of the TV remote control while the TV viewer is executed and the first page 1513 of the content is output to the display 1560, the display device 410 (for example, the display device 410 of FIG. 2) may output the second page 1515 of the content to the display 1560. When identifying selection of channel down using the TV remote control to move a channel number while the second page 1515 of the content is output to the display 1560, the display device 410 may move to the channel number reproduced through the TV tuner and output the content 1511 corresponding to the channel number to the display 1560 as illustrated in FIG. 15A.

According to various embodiments, a system for sharing content may include an electronic device (for example, the electronic device 201 of FIG. 2) configured to, based on identifying that a user of a display device to share content of the electronic device subscribes to a service for managing at least one external device registered for each piece of subscriber information and that the display device is registered in a server (for example, the first server 310 of FIG. 2) providing the service, transmit first information including a request for receiving the content or a request for generating a new channel for outputting the content to the display device through the server. The display device (for example, the display device 410 of FIG. 2) may be configured to, based on the first information being received through the server, perform at least one of storage of the content or generation of the new channel for outputting the content.

According to various embodiments, the electronic device may be configured to provide a list including at least one contact subscribing to the service among at least one contact included in an address book of the electronic device.

According to various embodiments, the electronic device may be configured to, based on a user of the display device not subscribing to the service, transmit a message or email that recommends subscription to the service to the user.

According to various embodiments, the server may be configured to, based on the first information including the request for receiving the content and the request for generating the new channel for outputting the content being received from the electronic device, transmit the first information including the request for receiving the content and the request for generating the new channel for outputting the content to the display device.

According to various embodiments, the server may be configured to, based on the first information including the request for receiving the content and the request for generating the new channel for outputting the content being received from the electronic device, store the content included in the first information in the server and transmit the first information including the request for generating the new channel for outputting the content to the display device.

According to various embodiments, the display device may be configured to, based on the first information including the request for receiving the content and the request for generating the new channel for outputting the content being received from the server, store the content in the display device or an external storage device connected to the display device, generate new channel for outputting the content, and store the new channel information to be correlated with information on a storage location of the content in which the content is stored.

According to various embodiments, the display device may be configured to, based on the first information including the request for generating the new channel for outputting the content being received from the server, transmit the generated new channel information to the server.

According to various embodiments, the server may be configured to, based on a request for generating notification information indicating generation of the new channel being made by the display device, generate the notification information indicating the generation of the new channel and transmit the notification information to the display device.

According to various embodiments, the display device may be configured to, based on notification information requested to the server being received, display the notification information and, based on selection of a new channel included in the notification information being identified and storage of the content in the display device or an external storage device connected to the display device being identified, detect the content in the display device or the external storage device connected to the display device, based on storage location information of the content stored to be correlated with new channel information, and output the detected content to the display device.

According to various embodiments, the display device may be configured to, based on notification information for which a request is made to the server being received, display the notification information and, based on selection of a new channel included in the notification information being identified and storage of the content in the server being identified, make a request for content stored to be correlated with new channel to the server and output the content received from the server to the display device.

According to various embodiments, an electronic device (for example, the display device 410 of FIG. 2) may include a display, a processor, and memory storing instructions that, when executed by the processor, cause the electronic device to, based on first information including a request for receiving content from a first electronic device (for example, the first electronic device 201 of FIG. 2) or a request for generating a new channel for outputting the content being received through a server (for example, the first server 310 of FIG. 2), perform at least one of storage of the content or generation of the new channel for outputting the content.

According to various embodiments, wherein the instructions, when executed by the processor, cause the electronic device to, based on the first information including the request for receiving the content and the request for generating the new channel for outputting the content being received from the server, store the content in the memory or an external storage device connected to the display device, and generate new channel information for outputting the content, and store the new channel information to be correlated with information on a storage location of the content in which the content is stored.

According to various embodiments, wherein the instructions, when executed by the processor, cause the electronic device to generate, as new channel information for outputting the content, channel information including a channel name configured based on subscription information of a first electronic device included in the first information, a new channel number, and information on content generated based on the content included in the first information, and store the generated new channel information in the memory.

According to various embodiments, wherein the instructions, when executed by the processor, cause the electronic device to generate a new channel number for at least one of a content broadcasting channel provided by Internet through a set-top box or an application stored in the memory or a general broadcasting channel reproduced through a TV tuner.

According to various embodiments, wherein the instructions, when executed by the processor, cause the electronic device to generate a new channel number for a predetermined broadcasting channel according to a preset priority between a content broadcasting channel provided by Internet through a set-top box or an application stored in the memory or a general broadcasting channel reproduced through a TV tuner.

According to various embodiments, wherein the instructions, when executed by the processor, cause the electronic device to, based on the first information including the request for generating the new channel for outputting the content being received from the server, generate new channel information and transmit the generated new channel information to the server.

According to various embodiments, wherein the instructions, when executed by the processor, cause the electronic device to generate, as the new channel information for outputting the content, channel information including a channel name configured based on subscription information of a first electronic device included in the first information, a new channel number, and information on content generated based on the content included in the first information and transmit the new channel information to the server.

According to various embodiments, wherein the instructions, when executed by the processor, cause the electronic device to, based on notification information for which a request is made to the server being received, display the notification information and, based on selection of a new channel number included in the notification information being identified and storage of the content in the memory or an external storage device connected to the display device being identified, detect the content in the memory or the external storage device connected to the display device, based on storage location information of the content stored to be correlated with new channel information including the new channel number, and output the detected content through the display.

According to various embodiments, wherein the instructions, when executed by the processor, cause the electronic device to, based on notification information for which a request is made to the server being received, display the notification information and, based on selection of a new channel number included in the notification information being identified and storage of the content in the server being identified, make a request for content stored to be correlated with new channel information including the new channel number to the server and output the content received from the server through the display.

According to various embodiments, wherein the instructions, when executed by the processor, cause the electronic device to streaming-receive the content from the server in real time based on multimedia and output the content through the display.

Figure 16:
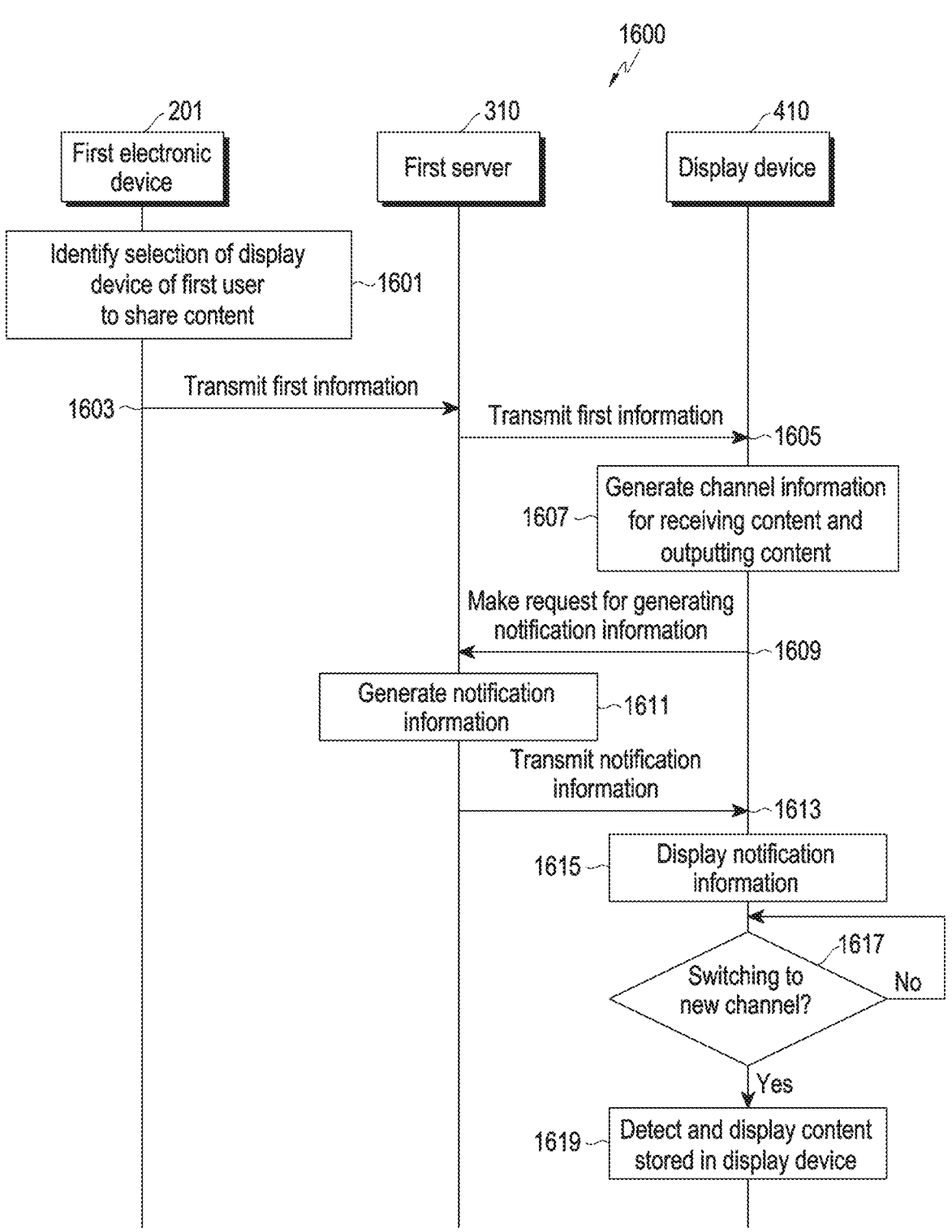
FIG. 16 is a flowchart illustrating an example operation of sharing content in an example system according to various embodiments.

FIG. 16 is a flowchart 1600 illustrating example operations of sharing content in an example system according to various embodiments. The operations of sharing the content may include operations 1601 to 1619. According to an embodiment, at least one of operations 1601 to 1619 may be omitted, the order of some operations may be changed, and/or other operations may be added. In FIG. 16, an operation in which a display device 410 stores content of a first electronic device 201 and generates a new channel for outputting the content is described as an example.

In operation 1601, the first electronic device (for example, the electronic device 101 of FIG. 1, the first electronic device 201 of FIG. 2, and/or the electronic device 201 of FIG. 4) may select the display device of the first user to share content.

According to an embodiment, when identifying that, after content to be shared is selected, the first user who is a target to share the content has subscribed to a first service that manages at least one external device registered for each piece of subscriber information and the display device 410 of the first user is registered in the first server 310 that provides the first service, the first electronic device 201 may generate first information including a content reception request and a request for generating a new channel for content output.

According to an embodiment, when the display device is selected from a sharing list displayed based on selection of a sharing menu to share the content of the first electronic device and at least one contact subscribing to the first service exists in at least one contact included in an address book of the first electronic device 201, the first electronic device 201 may provide a list including at least one contact subscribing to the first service. When identifying selection of the contact of the first user in a list including the contacts subscribing to the first service, the first electronic device 201 may generate first information including the content reception request and the request for generating the new channel for content output. The first electronic device 201 may include, in the first information, account information (for example, an email address) of the first user included as the contact of the first user.

According to an embodiment, when the first user to share content does not exist in the list including at least one contact subscribing to the first service, the first electronic device 201 may transmit account information of the first user input by the user to search for the first user to the first server 310 and, when identifying that the first user has subscribed to the first service, based on subscription information of the first user received from the first server 310 and the display device 410 of the first user is registered in the first server 310, add the contact of the first user to the address book, based on the subscription information of the first user. The first electronic device 201 may generate first information including the content reception request and the request for generating the new channel for content output, based on selection of the contact of the first user.

According to an embodiment, when the first user to share content does not exist in the list including at least one contact subscribing to the first service, the first electronic device 201 may transmit account information of the first user input by the user to the first server 310 to search for the first user, and, when identifying that the first user has subscribed to the first service, based on the subscription information of the first user received from the first server 310 but the display device 410 of the first user is not registered in the first server 310, transmit a message or email that recommends registration of the display device 410 of the first user in the first server 310 to the first user, based on selection of the user.

According to an embodiment, when the first user to share content does not exist in the list including at least one contact subscribing to the first service, the first electronic device 201 may transmit account information of the first user input by the user to search for the first user to the first server 310 and, when receiving information indicating that subscription information of the first user does not exist from the first server 310, transmit a message or email that recommends subscription to the first service and registration of the display device 410 of the first user to the first server 310, based on selection of the user.

In operation 1603, the first electronic device (for example, the electronic device 101 of FIG. 1, the first electronic device 201 of FIG. 2, and/or the electronic device 201 of FIG. 4) may transmit the first information to the first server 310 (for example, the first server 310 of FIG. 2).

According to an embodiment, the first electronic device 201 may transmit the first information including the content reception request and the request for generating the new channel for content output to the first server 310.

In operation 1605, the first server 310 (for example, the first server 310 of FIG. 2) may transmit the first information to the display device 410 (for example, the display device 410 of FIG. 4).

According to an embodiment, the first server 310 may transmit the first information including the content reception request and the request for generating the new channel for content output received from the first electronic device 201 to the display device 410 of the first user, based on subscription information of the first user and information on at least one external electronic device registered in the subscription information of the first user.

According to an embodiment, the first server 310 may include subscription information of the first electronic device in the first information.

In operation 1607, the display device 410 (for example, the display device 410 of FIG. 4) may generate channel information for storing the content and outputting the content.

According to an embodiment, when receiving the first information including the content reception request and the request for generating the new channel for content output through the first server 310, the display device 410 may store the content of the first electronic device included in the first information in the display device 410 or an external storage device connected to the display device and generate a new channel number for outputting the content of the first electronic device.

According to an embodiment, the display device 410 may generate, as channel information for outputting the content of the first electronic device, first channel information including a channel name configured as a user name of the first electronic device, a new channel number, and information on content detected based on the content included in the first information, based on the subscription information of the first electronic device included in the first information.

According to an embodiment, the display device 410 may store the first channel information to be correlated with storage location information of the content of the first electronic device 201 stored in the display device 410 or the external storage device connected to the display device.

In operation 1609, the display device 410 (for example, the display device 410 of FIG. 4) may make a request for generating notification information to the first server 310 (for example, the first server 310 of FIG. 2).

According to an embodiment, the display device 410 may make a request for generating notification information indicating the generation of the new channel to the first server 310.

In operation 1611, the first server 310 (for example, the first server 310 of FIG. 2) may generate notification information.

According to an embodiment, when a request for generating notification information indicating the generation of the first channel information newly generated to output the content of the first electronic device is made by the display device 410, the first server 310 may generate notification information including a channel name (for example, a user name of the first electronic device), a new channel number, and content information, based on the first channel information included in the information making the request for generating the notification information received from the display device 410.

In operation 1613, the first server 310 (for example, the first server 310 of FIG. 2) may transmit the notification information to the display device 410 (for example, the display device 410 of FIG. 2).

According to an embodiment, the notification information including the channel name (for example, the user name of the first electronic device), the new channel number, and the content information may be transmitted to the display device 410.

In operation 1615, the display device 410 (for example, the display device 410 of FIG. 2) may display the notification information.

According to an embodiment, when receiving the notification information from the first server 310, the display device 410 may display the notification information including the channel name (for example, the user name of the first electronic device), the new channel number, and the content information on the display of the display device 410.

When identifying selection of switching to the new channel in operation 1617, the display device 410 (for example, the display device 410 of FIG. 2) may detect content stored in the display device and display the detected content in operation 1619.

According to an embodiment, when identifying selection of switching to the new channel number included in the notification information, the display device 410 may detect the content of the first electronic device in the display device 410 or in the external storage device connected to the display device, based on storage location information of the content stored to be correlated with the first channel information generated to output the content of the first electronic device and display the detected content on the display device 410.

Figure 17:
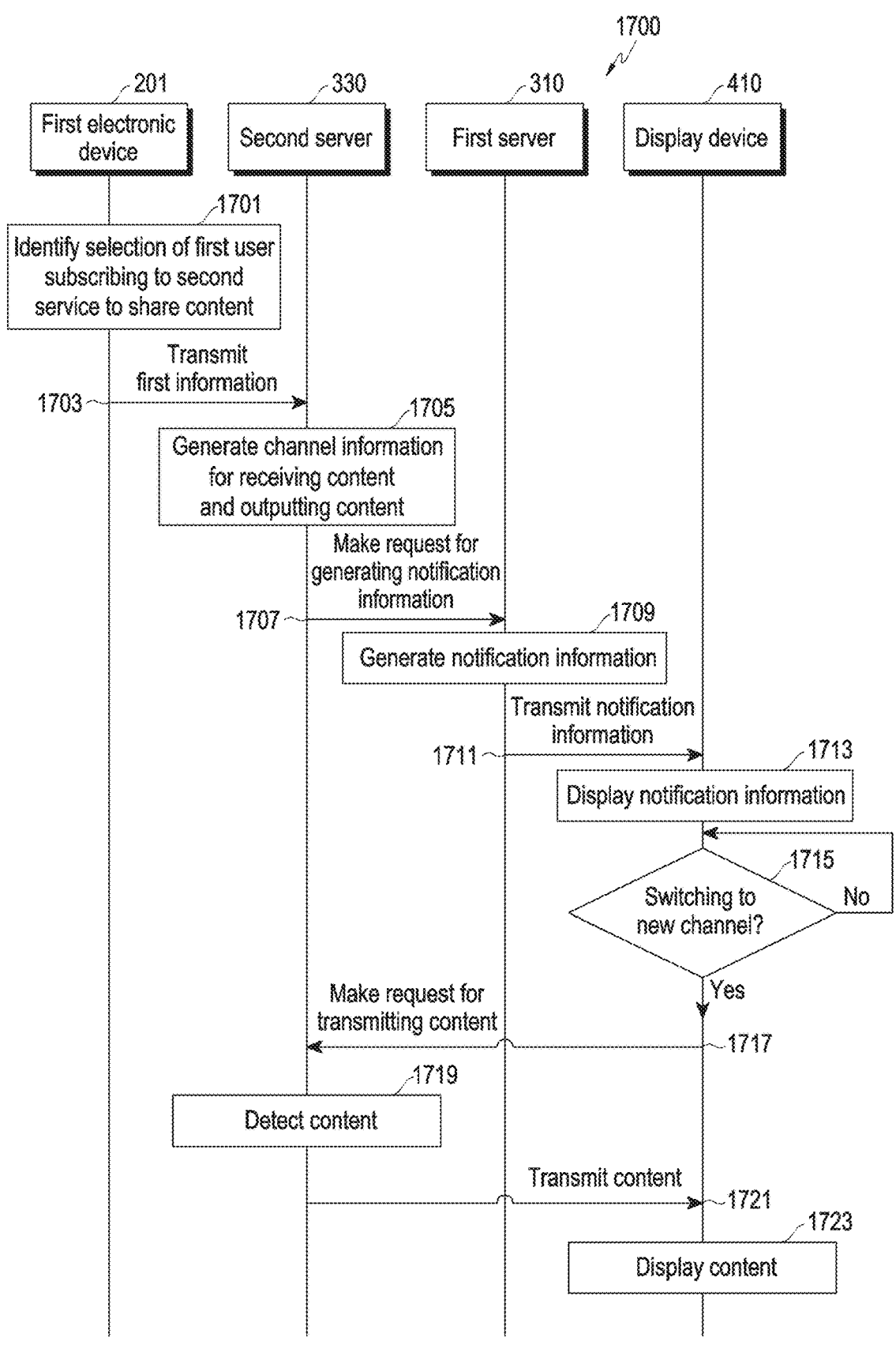
FIG. 17 is a flowchart illustrating an example operation of sharing content in an example system according to various embodiments.

FIG. 17 is a flowchart 1700 illustrating example operations of sharing content in an example system according to various embodiments. The operations of sharing the content may include operations 1701 to 1723. According to an embodiment, at least one of operations 1701 to 1723 may be omitted, the order of some operations may be changed, and/or other operations may be added.

In operation 1701, a first electronic device (for example, the electronic device 101 of FIG. 1, the first electronic device 201 of FIG. 3, and/or the electronic device 201 of FIG. 4) may identify selection of a first user subscribing to a second service to share content.

According to an embodiment, when the first user to share content stored in the first electronic device 21 subscribes to the second service that can provide various types of content for respective channel numbers, the first electronic device 201 may generate first information including a content reception request and a request for generating a new channel for content output.

According to an embodiment, the first electronic device 201 may include account information of the first user and/or content in the first information.

According to an embodiment, when the second service is selected from a sharing list displayed based on selection of a sharing menu to share the content of the first electronic device and at least one contact subscribing to the second service exists in at least one contact included in an address book of the first electronic device 201, the first electronic device 201 may provide a list including at least one contact subscribing to the second service. When identifying selection of the contact of the first user in the list of the contacts subscribing to the first service, the first electronic device 201 may generate first information including a content reception request and a request for generating a new channel for content output to the second server 330.

According to an embodiment, when the first user to share content does not exist in the list including at least one contact subscribing to the second service, the first electronic device 201 may transmit account information of the first user input by the user to search for the first user to the second server 330. When identifying that the first user has subscribed to the second service, based on subscription information of the first user received from the second server 330, the first electronic device 201 may generate first information including the content reception request and the request for generating the new channel for content output to the second server 330, based on selection of the contact of the first user.

According to an embodiment, when the first user to share content does not exist in the list including at least one contact subscribing to the second service, the first electronic device 201 may transmit account information of the first user input by the user to search for the first user to the second server 330 and, when receiving information indicating that subscription information of the first user does not exist from the second server 330, transmit a message or email that recommends subscription to the second service to the first user, based on selection of the user.

According to an embodiment, when a history of previous sharing with the second service exists, the first electronic device 201 may display sharing items previously shared with the second service in the sharing list displayed based on selection of the sharing menu.

In operation 1703, the first electronic device (for example, the electronic device 101 of FIG. 1, the first electronic device 201 of FIG. 3, and/or the electronic device 201 of FIG. 4) may transmit the first information to the second server (for example, the second server 330 of FIG. 3).

According to an embodiment, the first electronic device 201 may transmit the first information including the content reception request and the request for generating the new channel for content output to the second server 330.

In operation 1705, the second server 330 (for example, the second server 330 of FIG. 3) may generate channel information for storing the content and outputting the content.

According to an embodiment, the second server 330 may store the content of the first electronic device 201 included in the first information in a storage unit of the second server 330, generate a new channel number for outputting the content, and generate second channel information including a channel name (for example, a user name of the first electronic device), a new channel number, and content information as channel information for outputting the content of the first electronic device. The second server 330 may store the second channel information to be correlated with storage location information of the content of the first external electronic device stored in the storage unit of the second server 330.

According to an embodiment, the second server 330 may transmit newly generated second channel information to the display device 410 registered in the account information of the first user.

In operation 1707, the second server 330 (for example, the second server 330 of FIG. 3) may make a request for generating notification information to the first server 310 (for example, the first server 310 of FIG. 3).

According to an embodiment, the second server 330 may make a request for generating notification information indicating the generation of the second channel information newly generated to output the content of the first electronic device to the first server 310.

In operation 1709, the first server 310 (for example, the first server 310 of FIG. 3) may generate notification information.

According to an embodiment, notification information including a channel name (for example, a user name of the first electronic device), a new channel number, and content information may be generated based on the second channel information included in the notification information.

In operation 1711, the first server 310 (for example, the first server 310 of FIG. 3) may transmit the notification information to the display device 410 (for example, the display device 410 of FIG. 3).

According to an embodiment, the first server 310 may transmit notification information to the display device 410 of the first user among at least one external device registered in account information of the first user, based on subscription account information of the first user included in information making a request for generating the notification information received from the second server 330.

In operation 1713, the display device 410 (for example, the display device 410 of FIG. 3) may display notification information.

According to an embodiment, when receiving notification information indicating the generation of a new channel from the first server 310, the display device 410 may display the notification information including a channel name (for example, a user name of the first electronic device), a new channel number, and content information on the display of the display device 410.

When identifying selection of switching to the new channel, the display device 410 in operation 1715 (for example, the display device 410 of FIG. 3) may make a request for transmitting content to the second server 330 (for example, the second server 330 of FIG. 3) in operation 1717.

According to an embodiment, when identifying selection of switching to the new channel number included in the notification information, the display device 410 may make a request for content related to the second channel information for outputting the content of the first electronic device to the second server 330.

In operation 1719, the second server 330 (for example, the second server 330 of FIG. 3) may detect content.

According to an embodiment, when a request for transmitting content related to the channel number included in the second channel information is made by the display device 410, the second server 330 may detect the content of the first electronic device in the storage unit of the second server 330, based on storage location information of the content stored to be correlated with the second channel information.

In operation 1721, the second server 330 (for example, the second server 330 of FIG. 3) may transmit the content to the display device 410 (for example, the display device 410 of FIG. 4).

According to an embodiment, the second server 330 may transmit the content of the first electronic device detected in the storage unit of the second server 330 to the display device 410.

In operation 1723, the display device 410 (for example, the display device 410 of FIG. 4) may display the content.

According to an embodiment, the display device 410 may output the content received from the second server 330 to the display device 410.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101 or the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" simply refers to the storage medium being a tangible device, and does not include a signal (e.g., an electromagnetic wave); but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A system comprising an electronic device, and a display device configured to share content of the electronic device, wherein:

the electronic device is configured to, based on identifying that a user of the display device subscribes to a service for managing at least one external device and that the display device is registered in a server configured to provide the service, generate first information comprising a request for generating a new channel for the display device to output the shared content, and transmit the first information to the display device through the server; and the display device is configured to, based on receiving the first information, generate the new channel for outputting the shared content.

2. The system of claim 1, wherein the electronic device is configured to display a list comprising at least one contact subscribing to the service among contacts included in an address book of the electronic device.

3. The system of claim 1, wherein the server is configured to, based on receiving the first information from the electronic device, transmit the first information to the display device.

4. The system of claim 1, wherein the server is configured to, based on receiving the first information from the electronic device, store the shared content in memory of the server and transmit the first information to the display device.

5. The system of claim 1, wherein the display device is configured to, based on receiving the first information from the server, store the shared content in memory accessible to the display device, generate new channel information for outputting the shared content, and store the new channel information in association with information on a storage location of the shared content in the accessible memory.

6. The system of claim 1, wherein the display device is configured to, based on receiving the first information from the server, generate new channel information and transmit the generated new channel information to the server.

7. The system of claim 1, wherein the server is configured to, based on a request from the display device for generating notification information indicating generation of the new channel, generate the notification information, and transmit the notification information to the display device.

8. The system of claim 7, wherein the display device is configured to, based on receiving the notification information, display the notification information, and, based on selection of a new channel number included in the notification information being identified and storage of the content in memory accessible to the display device being identified, identify the shared content, based on a storage location information of the content associated with new channel information number, and output the identified shared content to the display device.

9. The system of claim 7, wherein the display device is configured to, based on receiving the notification information and, based on selection of a new channel number included in the notification information being identified and storage of the shared content in the server being identified, transmit a request for the shared content to the server, and output the shared content received from the server.

10. An electronic device comprising:

a display;

at least one processor comprising processing circuitry, and memory storing instructions that, when executed by the at least one processor, cause the electronic device to:

based on receiving from a server first information comprising a request for generating a new channel for outputting content shared by another electronic device through a service to which a user of the electronic device subscribes generate the new channel; and output the shared content based on selection of the new channel.

11. The electronic device of claim 10, wherein the instructions, when executed by the at least one processor, cause the electronic device to:

based on receiving the first information from the server, store the shared content in memory accessible to the electronic device; and generate, as new channel information for outputting the shared content, channel information comprising a channel name configured based on subscription information of the other electronic device, a new channel number, and information on content generated based on the shared content included in the first information, store the generated new channel information in the memory in association with a storage location of the content in the memory.

12. The electronic device of claim 11, wherein the instructions, when executed by the at least one processor, cause the electronic device to:

generate a new channel number for at least one of a content broadcasting channel provided by Internet through a set-top box or an application stored in the memory or a general broadcasting channel reproduced through a TV tuner, or generate a new channel number for a predetermined broadcasting channel according to a preset priority.

13. The electronic device of claim 10, wherein the instructions, when executed by the at least one processor, cause the electronic device to:

based on receiving the first information from the server, generate, as new channel information for outputting the shared content, channel information comprising a channel name configured based on subscription information of the other electronic device, a new channel number, and content information generated based on the shared content included in the first information, and transmit the generated new channel information to the server.

14. The electronic device of claim 10, wherein the instructions, when executed by the at least one processor, cause the electronic device to:

based on receiving notification information requested from the server, display the notification information and, based on identifying selection of a new channel number included in the notification information and storage of the content in the memory, identify the shared content in the memory, based on storage location information of the content correlated with the new channel number, and output the identified content through the display.

15. The electronic device of claim 10, wherein the instructions, when executed by the at least one processor, cause the electronic device to:

based on receiving requested notification information from the server, display the notification information, and based on identifying selection of a new channel number included in the notification information and storage of the shared content in the server, transmit a request for the shared content to the server and output, through the display, the shared content that is streamed and received from the server in real time.

* * * * *